(12) United States Patent
Kim et al.

(10) Patent No.: US 12,200,085 B2
(45) Date of Patent: Jan. 14, 2025

(54) METHOD AND APPARATUS FOR ADJUSTING APPLICATION CONTEXT RELOCATION IN EDGE COMPUTING SYSTEM

(71) Applicant: Samsung Electronics Co., Ltd., Suwon-si (KR)

(72) Inventors: Hyesung Kim, Suwon-si (KR); Sunghoon Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 17/758,348

(22) PCT Filed: Dec. 29, 2020

(86) PCT No.: PCT/KR2020/019292
§ 371 (c)(1),
(2) Date: Jul. 1, 2022

(87) PCT Pub. No.: WO2021/137579
PCT Pub. Date: Jul. 8, 2021

(65) Prior Publication Data
US 2023/0053805 A1    Feb. 23, 2023

(30) Foreign Application Priority Data

Jan. 3, 2020   (KR) .................. 10-2020-0001039
Jan. 3, 2020   (KR) .................. 10-2020-0001043
Dec. 29, 2020  (KR) .................. 10-2020-0185899

(51) Int. Cl.
*H04L 67/63*   (2022.01)
*H04L 67/289*  (2022.01)
*H04W 60/06*   (2009.01)

(52) U.S. Cl.
CPC ............ *H04L 67/63* (2022.05); *H04L 67/289* (2013.01); *H04W 60/06* (2013.01)

(58) Field of Classification Search
CPC ..... H04L 67/568; H04L 67/63; H04L 67/289; H04W 60/06
See application file for complete search history.

(56) References Cited

U.S. PATENT DOCUMENTS

| 10,219,193 B2 | 2/2019 | Kim et al. |
| 10,419,983 B2 * | 9/2019 | Zhu ........................ H04W 36/18 |

(Continued)

FOREIGN PATENT DOCUMENTS

| CN | 108781229 A | 11/2018 |
| KR | 10-2018-0021650 A | 3/2018 |

(Continued)

OTHER PUBLICATIONS

International Search Report and Written Opinion of the International Searching Authority dated Mar. 31, 2021, in connection with International Application No. PCT/KR2020/019292, 11 pages.

(Continued)

*Primary Examiner* — Jungwon Chang

(57) ABSTRACT

The present disclosure relates to a communication technique for fusing a 5G communication system with IoT technology to support a higher data rate than a 4G system, and a system thereof. The present disclosure can be applied to intelligent services (for example, smart homes, smart buildings, smart cities, smart cars or connected cars, healthcare, digital education, retail, security and safety related services, etc.) on the basis of 5G communication technology and IoT-related technology. According to one embodiment of the present disclosure, provided is a method of a first server in a wireless communication system. The method of the first server is characterized by comprising the steps of: receiving first information on whether a relocation procedure of an appli- (Continued)

cation context can be started from at least one of a terminal and an application server; confirming second information related to the relocation procedure of the application context on the basis of the first information; transmitting the second information to the terminal and the application server; and when it is confirmed that the relocation procedure of the application context is being performed, transmitting an indicator indicating that the relocation procedure of the application context is in progress to the terminal and the application server.

15 Claims, 19 Drawing Sheets

(56) References Cited

U.S. PATENT DOCUMENTS

| | | | |
|---|---|---|---|
| 10,716,034 | B2 | 7/2020 | Trang et al. |
| 11,196,840 | B2 | 12/2021 | Kim et al. |
| 2012/0063300 | A1 | 3/2012 | Sahin et al. |
| 2013/0212212 | A1* | 8/2013 | Addepalli ............. G06F 9/4856 709/217 |
| 2017/0135010 | A1 | 5/2017 | Iwai et al. |
| 2017/0195926 | A1 | 7/2017 | Iwai et al. |
| 2019/0053108 | A1 | 2/2019 | Trang et al. |
| 2019/0098474 | A1* | 3/2019 | Zhu ........................ H04W 4/50 |
| 2019/0261260 | A1* | 8/2019 | Dao ........................ H04W 8/08 |
| 2019/0373516 | A1 | 12/2019 | Caldenhoven et al. |
| 2020/0366732 | A1 | 11/2020 | Trang et al. |
| 2021/0058489 | A1* | 2/2021 | Kim ................. H04W 36/0033 |
| 2021/0112137 | A1* | 4/2021 | Soloway ............. H04L 67/568 |
| 2021/0136177 | A1* | 5/2021 | Hall .................... H04L 67/289 |
| 2021/0385617 | A1* | 12/2021 | Huang .................. H04W 4/50 |
| 2022/0124147 | A1* | 4/2022 | Ge ....................... H04L 67/1021 |
| 2022/0329648 | A1* | 10/2022 | De Foy .................. H04L 67/34 |
| 2022/0360977 | A1* | 11/2022 | Kim ....................... H04W 36/12 |
| 2023/0239675 | A1* | 7/2023 | Ge ....................... H04W 84/042 370/254 |

FOREIGN PATENT DOCUMENTS

| | | | |
|---|---|---|---|
| KR | 10-2018-0112825 A | | 10/2018 |
| KR | 10-2021-0023608 A | | 3/2021 |
| WO | 2019117793 A1 | | 6/2019 |
| WO | PCT/CN2020/119763 | * | 9/2020 |

OTHER PUBLICATIONS

Decision of Patent dated Apr. 28, 2022, in connection with Korean Application No. 10-2020-0185899, 9 pages.

3GPP TR 23.758 V17.0.0 (Dec. 2019), Technical Report, 3rd Generation Partnership Project; Technical Specification Group Services and System Aspects; Study on application architecture for enabling Edge Applications; (Release 17), Dec. 2019, 113 pages.

Supplementary European Search Report dated Dec. 13, 2022, in connection with European Application No. 20910150.0, 13 pages.

Samsung, "pCR on application context relocation," S6-200691 (revision of S6-20xxxx), 3GPP TSG-SA WG6 Meeting #37-e, e-meeting, May 14-26, 2020, 9 pages.

Samsung, "EAS service continuity capability," S6-200697 (revision of S6-20xxxx), 3GPP TSG-SA WG6 Meeting #37-e, e-meeting, May 14-26, 2020, 4 pages.

Samsung, "Application Context Relocation coordination," S6-202079 (revision of S6-20xxxx), 3GPP TSG-SA WG6 Meeting #40-e, e-meeting, Nov. 16-24, 2020, 2 pages.

The First Office Action dated Jul. 10, 2024, in connection with Chinese Application No. 202080091612.X, 11 pages.

* cited by examiner

METHOD AND APPARATUS FOR ADJUSTING APPLICATION CONTEXT RELOCATION IN EDGE COMPUTING SYSTEM

CROSS-REFERENCE TO RELATED APPLICATIONS

This application is a 371 of International Application No. PCT/KR2020/019292 filed on Dec. 29, 2020, which claims priority to Korean Patent Application No. 10-2020-0001039 filed on Jan. 3, 2020, Korean Patent Application No. 10-2020-0001043 filed on Jan. 3, 2020, and Korean Patent Application No. 10-2020-0185899 filed on Dec. 29, 2020, the disclosures of which are herein incorporated by reference in their entirety.

BACKGROUND

1. Field

The disclosure relates to a communication system, and a method for enabling a terminal to use a low-latency or broadband service. More specifically, the disclosure relates to a mobile edge computing (MEC) in which a terminal establishes a connection with an edge data network positioned close thereto, and accesses an application server running in an edge computing platform or an edge hosting environment operating in an edge enabler server (EES) of the corresponding edge data network to use a data service.

2. Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

SUMMARY

The disclosure provides a method of performing application context relocation between EASs for service continuity in an edge computing system. In case that it is necessary to change the EAS providing an edge computing service to a terminal, a procedure of transferring an application context from a source EAS to a target EAS may be triggered by several devices (e.g., EES, or edge enabler client (EEC) in a terminal, and application client). However, because a procedure of simultaneously transferring the application contexts by a plurality of devices may be initiated, a method capable of coordinating the procedure needs to be devised.

More specifically, in case that a method of coordinating an application context relocation procedure initiated by being triggered simultaneously by a plurality of devices is not provided, signaling due to the procedure may be repeatedly transmitted and received between devices, thereby causing a load on a system. For example, in case that a terminal does not recognize an application context relocation procedure that is being triggered and processed (in-progress) by another device in a network, the terminal triggers the application context relocation procedure, resulting in additional consumption of radio resources. Further, in some scenarios among various edge computing deployment scenarios according to a movement of the terminal, in case that the terminal leaves a service area of a source edge data network, communication with a source EEC and a source EAS may not be possible. In this case, in order for the moved terminal to receive a data service, it is necessary to devise a method of initiating an application context relocation procedure in the source edge data network (may refer to a network including the source EES and the source EAS) and enabling the terminal to know whether the procedure has been completed.

Further, the disclosure provides a method (e.g., UE service application programming interface (API) acquisition) of obtaining information on a terminal using an edge computing service through a 3rd generation partnership project (3GPP). In particular, the disclosure proposes a method of obtaining information on a terminal in case that a terminal using an edge computing service moves. That is, the disclosure is to reduce overhead according to an operation to be performed in order to obtain information required for an edge computing service through a 3GPP system as the terminal moves, and to provide the corresponding information while maintaining continuity. More specifically, the edge computing system may obtain information necessary for providing an edge computing service to the terminal through a 3GPP system. To this end, an EES subscribes to a network exposure function (NEF), which is one of 3GPP network functions (NFs), and the NEF subscribes to receive information on a target terminal from other 3GPP NFs, thereby receiving information on the terminal from the 3GPP system. However, in case that the terminal moves, overhead that should repeatedly subscribe/unsubscribe so as to obtain the information may occur in the 3GPP system. That is, a subscription/unsubscription configuration between an NF that exposes terminal related information to an edge computing device (e.g., EES) and an NF that provides terminal related information may be repeatedly performed. For example, when the terminal moves from a service area of a source EES to a service area of a target EES, persistence that obtains terminal related information (e.g., location information or terminal identification information, and the like) through the 3GPP system is cut off. This is because an EES that subscribes to an NF (e.g., NEF) that exposes the corresponding UE related information is changed according to a movement of the UE. Taking the 5G system as an example, an existing source EES may perform an operation (unsubscribe) of cancelling an event exposure subscription to the NEF for the corresponding terminal, and the NEF may cancel a subscription for receiving related information for another 3GPP NF. Therefore, it is necessary to devise a method capable of solving a problem of repeating subscription and unsubscription configurations between NFs caused by the movement of the terminal.

In order to solve the above problems, according to an embodiment of the disclosure, a method of a first server in a wireless communication system is provided. The method of a first server includes receiving first information on whether a relocation procedure of an application context may be initiated from at least one of a terminal or an application server; identifying second information related to the application context relocation procedure based on the first information; transmitting the second information to the terminal and the application server; and transmitting, in case that it is identified that the application context relocation procedure is performed, an indication indicating that the application context relocation procedure is in progress to the terminal and the application server.

Further, according to an embodiment of the disclosure, a method of a terminal in a wireless communication system is provided. The method of a terminal includes transmitting, to a first server, first information on whether an application context relocation procedure may be initiated; receiving second information related to the application context relocation procedure from the first server; and identifying whether to initiate the application context relocation procedure based on the second information, wherein the second information is identified based on the first information.

Further, according to an embodiment of the disclosure, a first server of a wireless communication system is provided. The first server includes a transceiver; and a controller configured to control the transceiver to receive first information on whether a relocation procedure of an application context may be initiated from at least one of a terminal or an application server, to identify second information related to the application context relocation procedure based on the first information, to control the transceiver to transmit the second information to the terminal and the application server, and to control the transceiver to transmit an indication indicating that the application context relocation procedure is in progress to the terminal and the application server in case that it is identified that the application context relocation procedure is performed.

Further, according to an embodiment of the disclosure, a terminal of a wireless communication system is provided. The terminal includes a transceiver; and a controller configured to control the transceiver to transmit, to a first server, first information on whether a relocation procedure of an application context may be initiated, to control the transceiver to receive, from the first server, second information related to the application context relocation procedure, and to identify whether to initiate the application context relocation procedure based on the second information, wherein the second information is identified based on the first information.

According to an embodiment of the disclosure, in a wireless communication system, an EES can select an application context relocation mode based on a capability of an EEC and an EAS, and accordingly, an application context relocation procedure can be performed.

Further, according to an embodiment of the disclosure, a method of preventing a plurality of devices from repeatedly performing initiation of an application context relocation procedure is provided, thereby reducing overhead due to unnecessary signaling.

Further, according to an embodiment of the disclosure, even in a deployment scenario in which communication with an EES and an EAS in a source edge data network is no longer possible according to a movement of a terminal, a method of notifying the terminal that an application context relocation procedure has been completed is provided; thus, the application context relocation procedure can be performed more stably.

Further, according to an embodiment of the disclosure, a method capable of minimizing overhead of an operation occurring between other 3GPP NFs and an NF that provides terminal related information obtainable through a 3GPP system to an edge computing system according to a change of an EES/EAS for providing edge computing services according to a movement of the terminal is provided. Specifically, a method capable of minimizing repetition of a subscription/unsubscription configuration between a 3GPP NF that exposes terminal related information to an edge computing device (e.g., EES) and a 3GPP NF that provides terminal related information is provided.

Effects obtainable in the disclosure are not limited to the above-mentioned effects, and other effects not mentioned will be clearly understood by those of ordinary skill in the art to which the disclosure belongs from the following description.

BRIEF DESCRIPTION OF THE DRAWINGS

The above and other objects, features and advantages of the disclosure will become clearer through the following description of embodiments of the disclosure with reference to the accompanying drawings.

DETAILED DESCRIPTION

Figure 1:
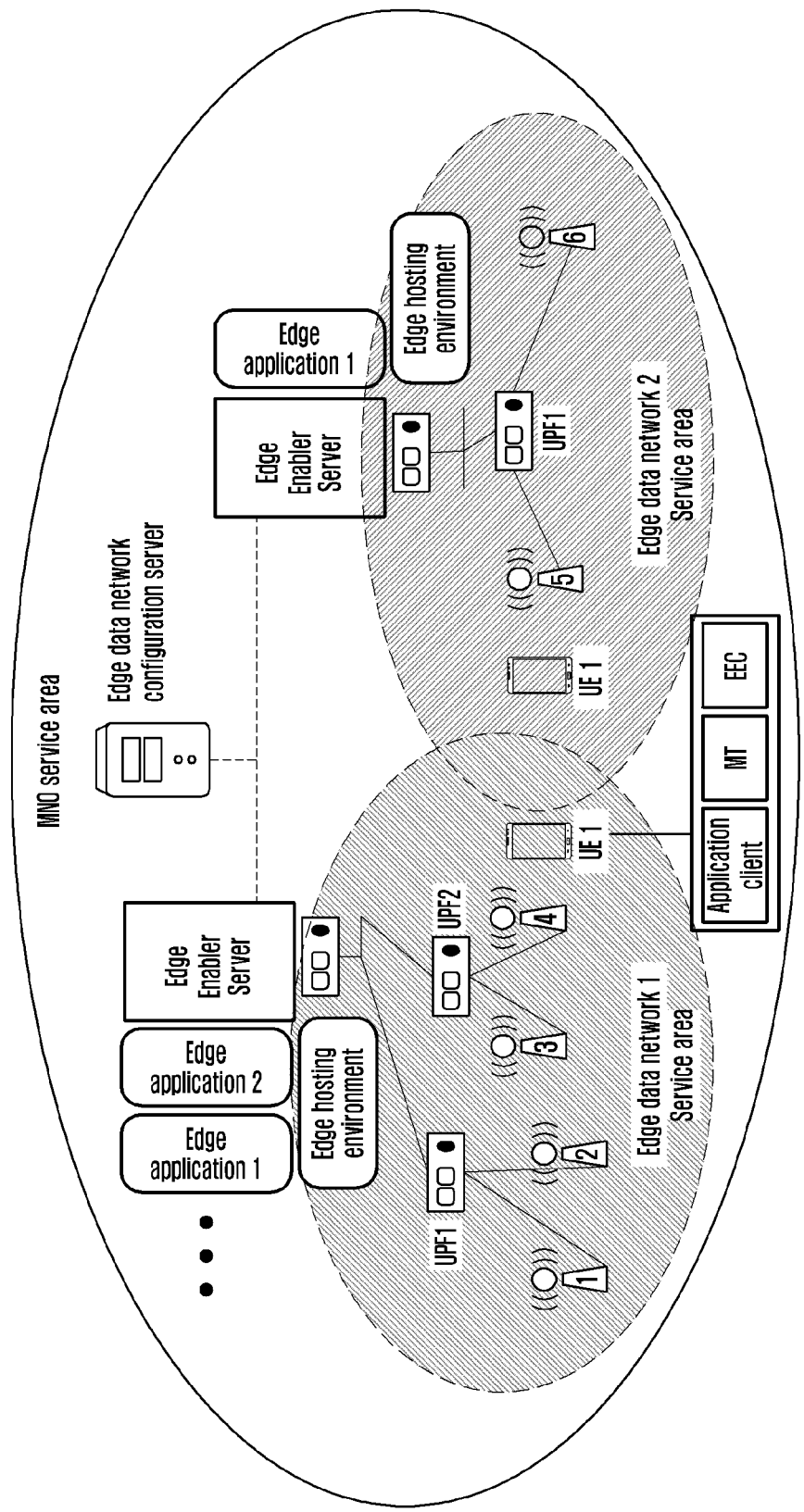
FIG. 1 is a diagram illustrating an example of implementation scenarios of an edge computing system to which embodiments of the disclosure may be applied.

Hereinafter, an operating principle of the disclosure will be described in detail with reference to the accompanying drawings. Terms to be described later are terms defined in consideration of functions in the disclosure. Because this may vary according to the intention or custom of a user or operator, the definition should be determined according to the contents throughout this specification.

Terms indicating a network entity and entities of an edge computing system, terms indicating messages, and terms indicating identification information used in the disclosure are exemplified for convenience of description. Accordingly, the disclosure is not limited to the terms described below, and other terms indicating objects having equivalent technical meanings may be used.

Hereinafter, for convenience, the disclosure uses terms and names defined in the 5G system standard, but is not limited by the terms and names, and may be equally applied to systems conforming to other standards.

In an edge computing service, an UE service API is an API necessary for obtaining and providing terminal related information necessary for providing the edge computing service, and UE service API context information of the disclosure may include at least one of the following items.

- an ID, address, and subscription correlation ID of an NF (e.g., NEF, service capability exposure function (SCEF)) that exposes the corresponding terminal information (reference ID that can identify an event subscribed to the NF in which the edge computing device exposes), an S-NSSAI of a slice to which the corresponding NF belongs, an event ID supported by an application function, or information used for NEF discovery such as a domain name.
- Information on the terminal: UE ID (e.g., GPSI, external identifier, external group identifier), EEC ID, UE IP address.
- Application related information in which the terminal is receiving a service: application ID (application client ID) receiving an edge computing service, an EAS ID/address providing an edge computing service, an EAS instance ID, or edge computing service provider information.

In the disclosure, a term used as a function may mean a device that performs the function.

In the disclosure, a source edge enabler server may be referred to as a source EES, an S-EES, a first server, and the like, and may be referred to by terms having the same or similar meaning. Hereinafter, the source edge enabler server will be referred to as a source EES.

In the disclosure, a source edge application server may be referred to as a source EAS, an S-EAS, or the like, and may be referred to by terms having the same or similar meaning. Hereinafter, the source edge application server will be referred to as a source EAS.

In the disclosure, a target edge enabler server may be referred to as a target EES, an object EES, a T-EES, a second server, and the like, and may be referred to by terms having the same or similar meaning. Hereinafter, the target edge enabler server will be referred to as a target EES.

In the disclosure, a target edge application server may be referred to as a target EAS, T-EAS, or the like, and may be referred to by terms having the same or similar meaning. Hereinafter, the target edge application server will be referred to as a target EAS.

Further, in the disclosure, an edge enabling client may be referred to as an EEC, EEC in a terminal, a terminal, and the like, and may be referred to by terms having the same or similar meaning. Hereinafter, the edge enabling client will be referred to as EEC.

FIG. 1 is a diagram illustrating an example of implementation scenarios of an edge computing system to which embodiments of the disclosure may be applied.

A user plane function (UPF) (or a network entity capable of performing an UPF) may serve as a gateway for transferring a packet to be transmitted and received. To support edge computing services, an EES may be positioned close to the UPF. The UPF transmits directly a data packet to an edge data network without going through the Internet, so that low-latency transmission may be performed. The UPF may also be connected to a data network connected to the Internet.

An edge computing system to which the disclosure may be applied may include an EES, an edge data network configuration server, and an EEC. The EES may build an edge hosting environment (or edge computing platform) and know information on EAS running in the edge hosting environment.

The EES may perform a function of negotiating with the UE to connect an application client of the UE and an EAS in the edge hosting environment. A UE supporting the edge computing system may have a built-in EEC, and negotiation between the UE and the EES may be performed through interworking between the EEC and the EES. A layer that performs interworking between the EEC and the EES such as the negotiation may be referred to as an edge enabling layer. The UE mentioned in the disclosure may include all UEs capable of performing wireless communication, such as an Internet of things (IoT) device, vehicle, drone, and robot, as well as smart phone.

The edge data network configuration server knows deployment information of EESs, and may perform a function of transferring configuration information for using the edge computing service to the UE. The configuration information may include at least one of edge data network connection information (e.g., data network name, S-NSSAI, and the like), edge data network service area (e.g., cell list, list of tracking area, PLMN ID), or EES connection (edge enabler server connection) information (e.g., URI). That is, the UE may identify (or obtain) information on an accessible EES at a specific location. When the edge data network configuration server may know information on an EAS running in an edge hosting environment of a specific EES, the UE may also obtain the corresponding information through the EEC.

The EAS refers to a third-party application server running within an edge computing system. The EAS is a third-party application server running in an infrastructure provided by the edge hosting environment. Because the EAS may provide a service at a location close to the UE, the EAS may provide an ultra-low latency service to the UE. In the EAS, information on an upper layer of a service provided to the UE may be referred to as an application context.

For example, when a user uses a real-time game application, all information necessary for regenerating a currently displayed screen and play stage according to the use of the game application may be included in an application context. The application context may be relocated to the EAS to be newly connected so that the UE may be connected to another EAS to seamlessly use an existing service. In order to perform the application context relocation, an EAS capable of providing a service to an application running in an application client of the UE should be available. Availability of the EAS in the edge data network may be determined according to whether the EAS is driven in the edge hosting environment and a state of the EAS.

The UE may include an application client, an EEC for interworking the application client with the edge computing service, and a mobile terminal (MT) for accessing a mobile communication system.

A UE application is an application provided by a third party, and may refer to a client application program running in the UE for a specific application service. Several applications may be driven in the UE. At least one of the various applications may use a mobile edge computing (MEC) service.

The EEC in the UE may refer to a client that performs an operation in the UE necessary for using the edge computing service. The EEC may perform an operation of determining which applications may use an edge computing service and connecting a network interface so that data of the application client in the UE may be transmitted to the EAS that provides the edge computing service.

An operation for establishing data connection using the edge computing service may be performed in a 3rd generation partnership project (3GPP) communication layer through an MT in the UE. The 3GPP communication layer may mean a layer that performs an operation (e.g., modem operation) for using a mobile communication system and perform at least one of roles of establishing a wireless connection for data communication, registering a UE in the mobile communication system, establishing a connection for data transmission to a communication system, and transmitting and receiving data.

A method of determining (identifying) the necessity to perform application context relocation in the above-described edge computing system and a method of determining a target EES or a target EAS will be described below with reference to FIG. 2.

Figure 2:
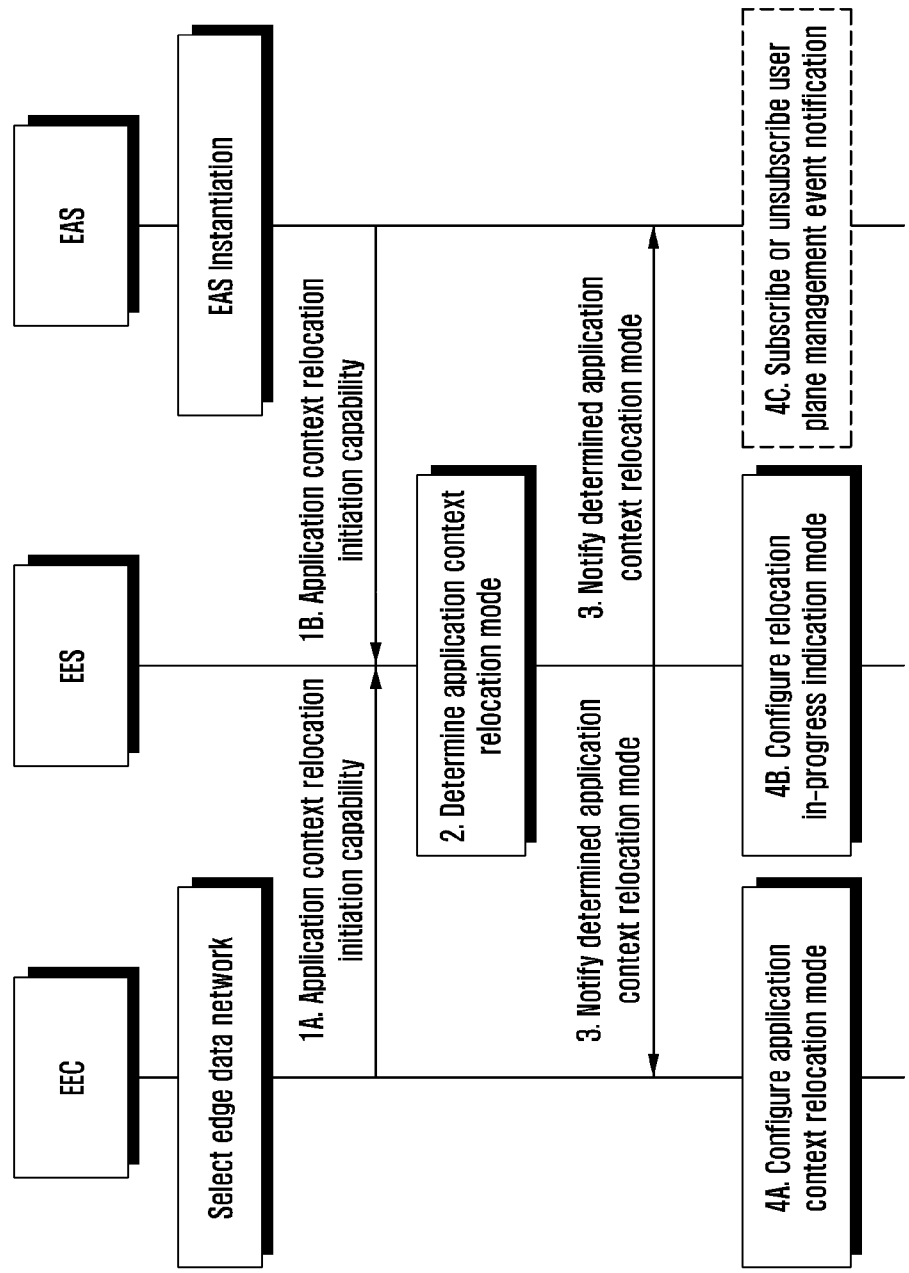
FIG. 2 is a message flow diagram illustrating a method of selecting an application context relocation mode between an EEC, EES, and EAS in a terminal according to an embodiment of the disclosure.

FIG. 2 is a message flow diagram illustrating a method of selecting an application context relocation mode between an EEC, EES, and EAS in a UE according to an embodiment of the disclosure.

With reference to FIG. 2, in step 1A, the EEC in the UE may notify the EES of an application context relocation initiation UE capability of the UE. That is, the EEC may transmit capability information on whether the UE may initiate the application context relocation procedure to the EES.

An operation of transmitting the capability information may be performed when the EEC performs a registration procedure (EEC registration procedure) (may include an initial registration procedure and a registration update procedure) to the EES or when the EEC transmits a registration request to the EES. That is, the EEC may include and transmit capability information in the registration request or a message transmitting to the EES in the registration procedure. Alternatively, an operation of transmitting the capability information may be performed through a separate procedure immediately after execution of the application client.

In an operation of transmitting the capability information, the EEC may identify whether the application client and the MT in the UE may initiate the application context relocation procedure, and transmit it to the EES. Application context relocation initiation UE capability of the UE according to the disclosure may include at least one of the following information.

Whether it is possible to initiate application context relocation of the UE

Information that may be considered or necessary information in determining whether to initiate the application context relocation procedure (e.g., edge data network service area), a required application key performance indicator (or QoS)

Estimated time required to perform application context relocation initiation operation Further, in step 1B, the EAS may notify the EES of an application context relocation initiation EAS capability.

That is, the EAS may transmit, to the EES, capability information on whether it may initiate an application context relocation procedure.

An operation of transmitting the capability information may be performed when the EAS performs a registration procedure (EAS registration procedure) (may include an initial registration procedure and a registration update procedure) to the EES or when the EAS transmits a registration request to the EES. Alternatively, an operation of transmitting the capability information may be performed as a separate operation after receiving a notification for EEC registration from the EES.

In the operation of transmitting the capability information, the EAS may identify whether it may initiate the application context relocation procedure and transmit it to the EES. Application context relocation initiation EAS capability according to the disclosure may include at least one of the following information.

Whether the EAS may initiate application context relocation

Information that may be considered or necessary information in determining whether to initiate the application context relocation procedure Whether to subscribe to user plane (UP) management event notification or whether user plane (UP) management event notification may be subscribed to Whether it is possible to service to the application client (e.g., whether to initiate application context relocation for load balancing according to a load, key performance indicators of the required application (required application KPI) (or QoS)

Estimated time required to perform an application context relocation initiation operation In step 1A or 1B, in order for the EEC or the EAS to delegate initiation of the application context relocation procedure to the EES instead of a capability to initiate application context relocation, the EEC or the EAS may transmit a delegation request for application context relocation initiation to the EES. Upon receiving the delegation request, the EES may perform a pre-operation of determining whether an application context relocation procedure needs to be initiated. The pre-operation may include an operation in which the EES transmits a subscription request for a related event notification service to a network exposure function (NEF) in order to track a location of the UE or monitor a user plane path management event.

In step 2, the EES may select (or determine) an application context relocation mode (hereinafter, referred to as a relocation mode) based on an application context relocation initiation UE capability and an application context relocation initiation EAS capability received from the EEC and the EAS, respectively.

In the disclosure, the relocation mode may mean including information on a subject that initiates the application context relocation procedure and information on a condition for initiating the application context relocation procedure, and operating based on the information. That is, the EES, EAS, and EEC may identify whether they can initiate the application context relocation procedure according to the selected relocation mode, and be configured to operate according to a condition capable of initiating the procedure.

The EES may determine a relocation mode based on a predetermined method or information without receiving capability information of the UE or the EAS (e.g., in case that the EES knows in advance capability information of the UE or the EAS, based on the information). For example, the EES may receive related information from an edge data network configuration server without receiving capability information from the EEC and the EAS. In order for the EEC to receive edge data network configuration information, the EEC may provide capability information of the EEC while transmitting an initial provisioning request to the edge data network configuration server, and the edge data network configuration server may transmit the information to the EES to which the EEC will access. The corresponding information may be transmitted before the EEC accesses the EES. This is because the edge data network configuration server may know an EES to be accessed by the EEC based on application client related information and UE related information (e.g., connectivity information such as public local mobile network ID, or location information of the UE) provided by the EEC.

FIG. 2 of the disclosure illustrates an embodiment in which the EES selects a relocation mode based on information on a capability of the UE received from the EEC and information on a capability of the EAS received from the EAS, but the disclosure is not limited thereto. That is, the EES may select a relocation mode based on information on a capability of the UE from the EEC or may select a relocation mode based on information on a capability of the EAS received from the EAS.

The relocation mode may be configured for each UE, configured for each application (e.g., configure a different mode for each EAS), or configured for each EES (therefore, configuration information on the EAS registered in the EES may be the same). Hereinafter, a method for the EES to select a relocation mode will be described.

The EES may determine which device is allowed to initiate the application context relocation procedure based on information on an application context relocation initiation capability of the received UE or EAS. However, the device that allows initiation of the procedure is not limited to one. In this case, in selecting the relocation mode, the EES may determine in consideration of an application context relocation initiation capability thereof Initiation from a plurality of devices may be allowed. This is to cope with a situation requiring application context relocation according to various situations (e.g., may include a situation requiring application context relocation according to a loss of a service supply capability of the EAS and application context relocation according to a location movement of the UE. In this case, for rapid execution of the application context relocation procedure, the EES may select a relocation mode that allows both the UE and the EAS to initiate the procedure).

The EES may designate a configuration of conditions in which it should initiate application context relocation and initiation conditions of the application context relocation procedure for each of the UE and the EAS, as illustrated in the example below (however, the disclosure is not limited to the examples presented below).

Example 1) The EEC performs initiation according to departure from a service area, and the EAS performs initiation because an application client service cannot be provided according to a load.

Example 2) The EEC performs initiation according to departure from a service area, the EES performs application context relocation due to abnormal termination or abnormality of the EAS. In this case, the EAS may prohibit initiation.

Example 3) The EEC and the EES perform application context relocation according to departure from a service area, and the EAS performs initiation due to unavailability of service.

In step 3, the EES may notify the EEC and EAS of the configured or coordinated relocation mode. In case that the relocation mode is configured differently for each UE, the EES may include information (e.g., UE ID, UE IP address, or EEC ID) capable of identifying the UE or the EEC in the UE. In this case, the relocation mode may be notified, as illustrated in the following example. However, the following examples are given as examples in embodiments of the disclosure, and the disclosure is not limited thereto. That is, the EES may notify the UE and the EAS of the relocation mode based on various methods.

Example 1) In case that only whether to allow initiation of the application context relocation procedure may be transmitted, all on whether to allow for each device may be transmitted (e.g., {EEC: O, EES: X, EAS: O}), or whether to allow initiation of only a device receiving whether to allow (e.g., {O} or {X}) may be transmitted.

Example 2) Whether to allow initiation of the application context relocation procedure and conditions to be considered (see the example of step 2) may also be transmitted.

In step 4A, by reflecting information received from the EES, the EEC may configure a relocation mode. For example, the EEC may continue or may not perform an operation of comparing location information of the UE and a service area of the EES. Alternatively, the EEC may determine whether to perform a monitoring or reporting operation for a relocation requirement (i.e., a condition considered to initiate an application context relocation procedure) from an application client and a modem in the UE. That is, according to the relocation mode, the EES may identify whether it may initiate the application context relocation procedure, and perform an operation accordingly. The EEC may transmit configuration information on the relocation mode received from the EES to the application client and the MT in the UE. In this case, the application client and the MT may additionally perform a configuration related to initiation of the application context relocation procedure.

In step 4B, the EES may determine to which device to transmit relocation in-progress indication. That is, the EES may determine a device to transmit the relocation in-progress indication. The EES may identify a device capable of initiating an application context relocation procedure based on a configured relocation mode, thereby reducing transmission of an unnecessary relocation in-progress indication.

That is, the EES transmits a relocation in-progress indication to a device capable of initiating the application context relocation procedure, thereby notifying that the procedure is in progress to prevent redundant operations, and does not transmit a relocation in-progress indication to a device that cannot initiate the application context relocation procedure, thereby reducing signaling overhead due to transmission of an unnecessary relocation in-progress indication.

In case that the EEC is newly connected to the target EES, the EEC may provide information on a relocation mode received from a previous source EES to the target EES. In this case, a detailed description of the relocation in-progress indication is as follows.

Relocation in-progress indication: In case that initiation of the application context relocation procedure is allowed to a plurality of devices, the relocation in-progress indication is a message (or indication) that notifies another device that a procedure for context relocation has already initiated from one device to be transmitted (transferred) so as to prevent duplicate procedure progress. The relocation in-progress indication may include information on a device that initiates the relocation procedure together with information indicating that the procedure for context relocation has initiated.

The EES may subscribe to or cancel user plane path management event notifications for the corresponding UE according to the determined relocation mode. In this case, the EES may refer to a newly connected target EES.

In case that it is identified the fact that a new UE has entered a service area of a target EES according to the determined relocation mode, the target EES may determine whether to notify that the UE has moved to a service area thereof to a source EES to which the UE has been previously connected. (e.g., in case that initiation of the relocation procedure is allowed to the UE, the target EES may recognize that the UE has moved to a service area thereof through an EEC registration procedure, and notify the source EES of the fact.)

In step 4C, the EAS may subscribe to or cancel user plane management event notifications for the corresponding UE based on the relocation mode received from the EES.

Hereinafter, a process in which an application context relocation procedure according to the disclosure is performed based on the above-described relocation mode will be described.

Figure 3:
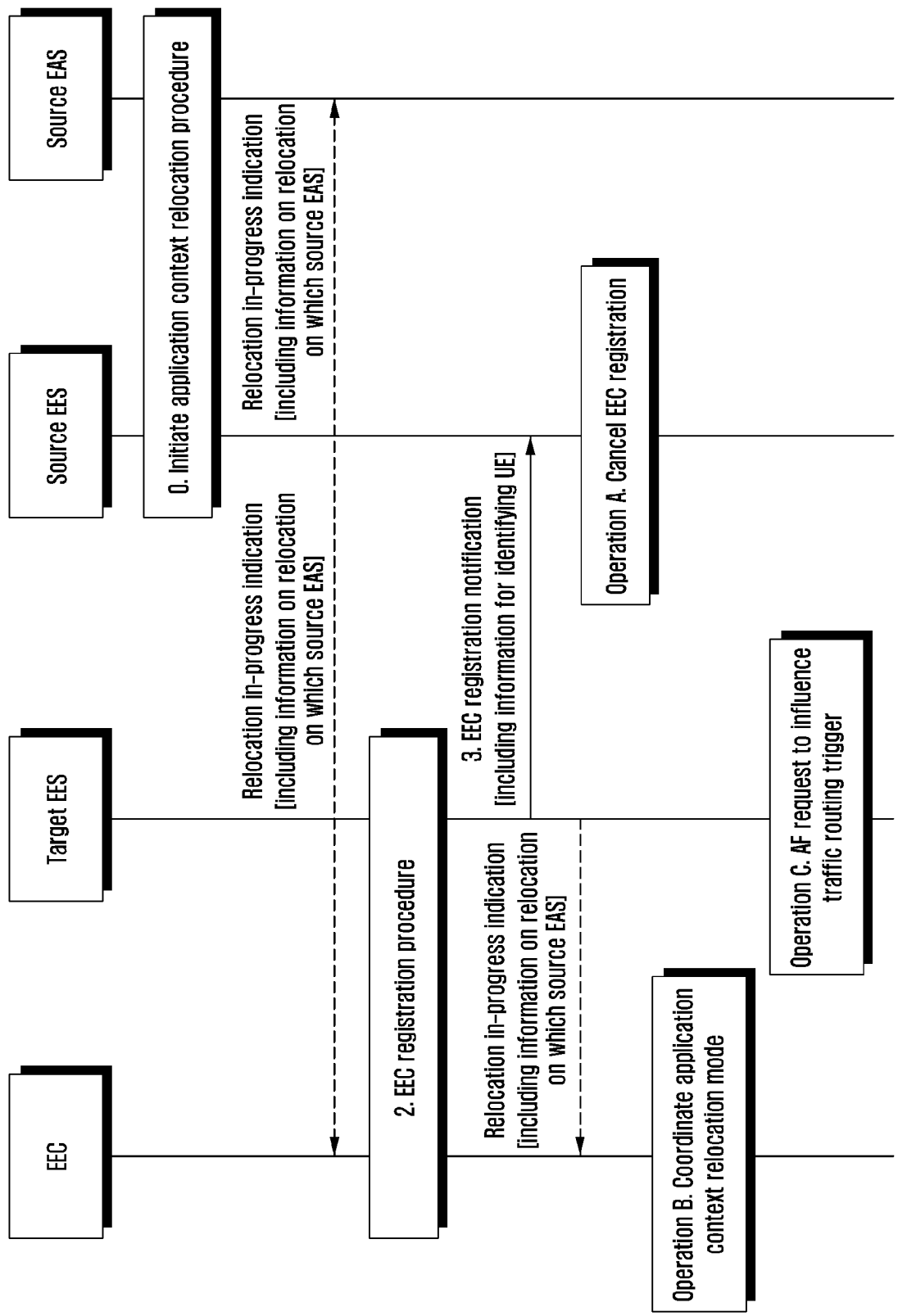
FIG. 3 is a message flow diagram illustrating an embodiment in which coordination is performed in an application context relocation procedure according to the disclosure.

FIG. 3 is a message flow diagram illustrating an embodiment in which coordination is performed in an application context relocation procedure according to the disclosure.

With reference to FIG. 3, FIG. 3 is a message flow diagram illustrating an embodiment in which an application context relocation procedure is performed in a deployment scenario in which a communication range between a UE and a source EES is limited to a service area of the source EES. This embodiment may be applied to all scenarios in which the UE is no longer able to communicate with the source EES after a source EES based application context relocation procedure is initiated.

For example, this embodiment may be applied in case that the source EES (or the source EAS) initiates the application context relocation procedure and the UE moves to a service area of the target EES before the procedure is completed. A detailed description thereof will be described below.

With reference to FIG. 3, in step 0, the source EES or the source EAS may initiate an application context relocation procedure. As described above, the UE may move to a service area of the target EES. This embodiment may be applied even in case that the UE moves at any time point before the relocation procedure is completed.

In step 1, the source EES or the source EAS may transmit a relocation-in-progress indication to each device based on a configured relocation mode. In this case, the relocation mode may be configured according to the above method described with reference to FIG. 2. Alternatively, the relocation mode may be preconfigured to the EES. Alternatively, in case that the EES or the EAS knows a capability of each device, the relocation mode may be configured without exchanging separate capability information in FIG. 2, and the EES or the EAS may transmit a relocation in-progress indication to the determined device according to the configured relocation mode. A detailed description thereof refers to the above description.

In this case, the source EES or the source EAS transmits a relocation in-progress indication to only devices (e.g., EEC or source EAS(s)) that allows initiation of the application context relocation procedure in the relocation mode (e.g., the relocation mode selected (determined) by the source EES), thereby reducing signaling overhead. However, in case that the relocation mode is not configured, the source EES or the source EAS may transmit a relocation in-progress indication to all devices. In this case, all the devices may include devices (EEC, EAS) belonging to a service area of the source EES or other EESs.

The relocation in-progress indication may include information indicating that the corresponding application context relocation procedure is already in progress. Further, the indication may include information on which application of the UE context relocation is in progress (e.g., application ID or EAS (instance) ID). Further, the relocation in-progress indication transmitting to the source EAS may include information capable of identifying the UE or EEC (e.g., EEC ID, UE ID, UE IP address, or ID assigned from authentication and authorization function).

As described above, in case that initiation of the application context relocation procedure is not allowed to the UE, the EES or the EAS does not transmit the above relocation in-progress indication to the EEC of the corresponding UE, thereby reducing signaling overhead.

Further, the source EES may notify other source EASs of information on the application context relocation procedure initiated from the source EAS through the relocation in-progress indication, thereby preventing initiation of the redundant procedure.

In step 2, the EEC in the UE may perform a registration procedure with the target EES. In case that the EEC does not perform a registration procedure, the EEC may notify the target EES that it has moved to a target EES service area through separate signaling.

In step 3, the target EES may transmit an EEC registration event notification to the source EES. In this case, the target EES may transmit an EEC registration event notification by including information capable of identifying the UE or the EEC in the UE. Information capable of identifying the UE or the EEC in the UE may mean, for example, an EEC ID, a UE ID, a UE IP address, or an ID assigned from an authentication and authorization function. In step 4, the target EES may transmit a relocation in-progress indication to the EEC.

That is, in order to prevent initiation of the application context relocation procedure in the UE, the target EES may transmit a relocation in-progress indication to the UE. For example, in case that the indication is not transmitted in step 1 according to a specific condition (e.g., in case that the UE leaves the service area of the source EES before transmitting the indication), the target EES may transmit the indication to the UE. Alternatively, the target EES may transmit the indication to the UE regardless of whether the operation of step 1 is performed.

The relocation in-progress indication may include information indicating that a procedure is already in progress, and further include information on which application of the UE context relocation is in progress. (e.g., application ID or EAS (instance) ID).

In operation A, the source EES may determine whether the UE has left a service area thereof based on the EEC registration event notification received from the target EES. In case that the UE leaves the service area of the source EES, the UE may perform an EEC de-registration operation after the application context relocation procedure for the UE is completed.

In operation B, the UE may coordinate the relocation mode.

Even if a previously configured initiation condition of the application context relocation procedure is satisfied, the UE may coordinate the relocation mode so as not to initiate the procedure based on the relocation in-progress indication received from the target EES. The coordination operation may be applied to each application client or may be applied collectively to all running application clients. This may be determined according to EAS information and the application included in the relocation in-progress indication.

In operation C, the target EES may perform AF influence on traffic routing to the target EAS in which the application context relocation has been completed for application data traffic instead of the source EES. This is because the source EES may no longer perform an application function request to influence traffic routing for the UE. Alternatively, the target EES may notify the EEC in the UE of completion of the application context relocation procedure and enable the EEC to perform application data traffic re-routing.

Figure 4:
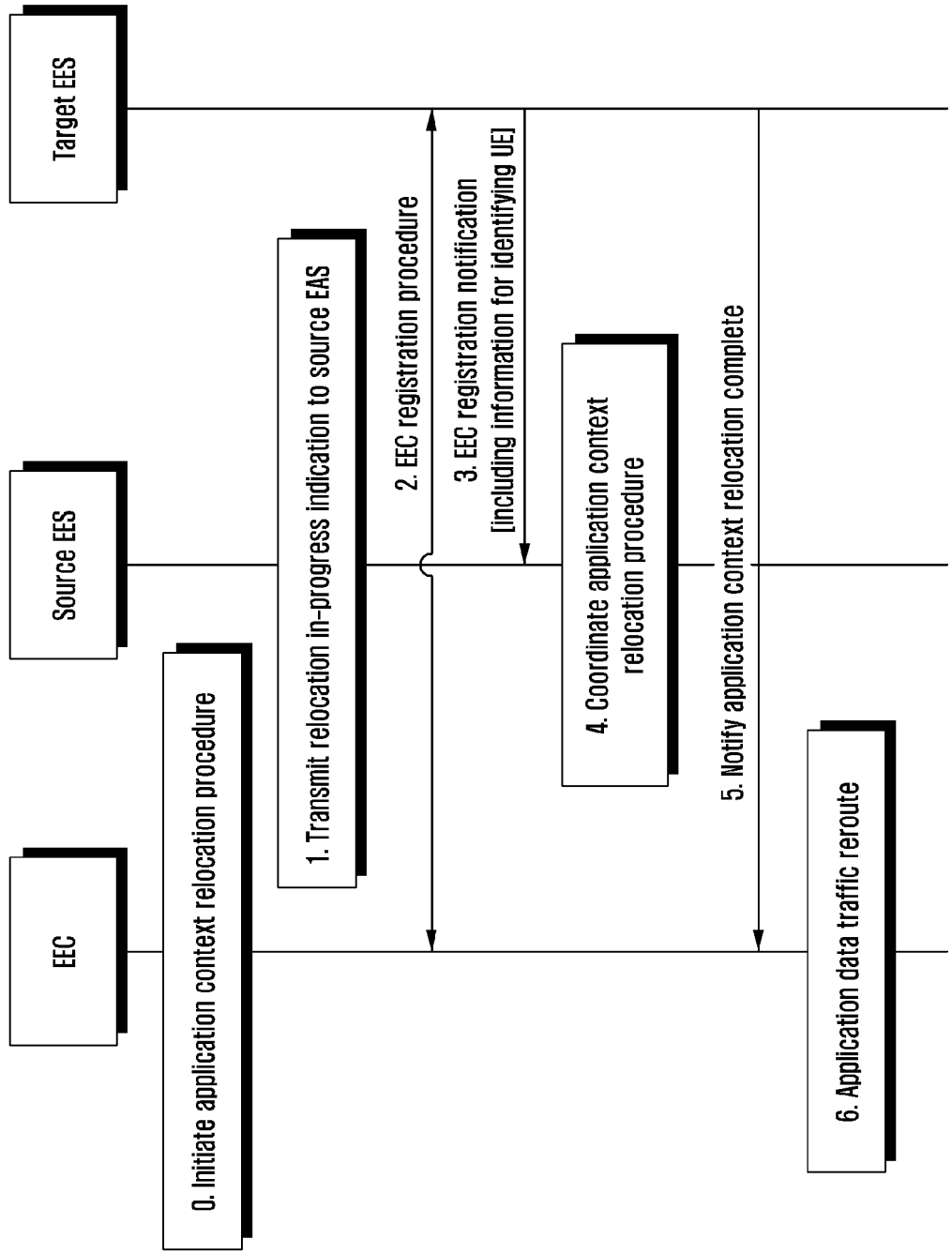
FIG. 4 is a message flow diagram illustrating an embodiment in which coordination is performed in an application context relocation procedure according to the disclosure.

FIG. 4 is a message flow diagram illustrating an embodiment in which coordination is performed in an application context relocation procedure according to an embodiment of the disclosure.

FIG. 4 is a message flow diagram illustrating a process in which an application context relocation procedure is performed in a deployment scenario in which a communication range between a UE and a source EES is limited to a service area of the source EES.

This embodiment may be applied to all scenarios in which the UE is no longer able to communicate with the source EES after a source EES based application context relocation procedure initiates.

Specifically, in step 0, the UE or the EEC in the UE may initiate an application context relocation procedure to transmit a context relocation request (or context relocation request message, application context relocation request, application context relocation request message) to the source EES. However, before the procedure is completed, the UE may move to a target EES service area, and in such a situation, this embodiment may be applied. This embodiment may be applied even in case that the UE moves at any time point before the relocation procedure is completed.

In step 1, the source EES may transmit a relocation in-progress indication to the source EAS that provides a service to the UE. Specifically, the source EAS may identify a device (e.g., source EAS) to transmit the indication according to the configured relocation mode. A method of configuring the relocation mode is the same as that described above, and will be omitted below.

The relocation in-progress indication may include information (e.g., at least one of an EEC ID, an UE ID, an UE IP address, or an ID assigned from an authentication and authorization function) capable of identifying the UE or the EEC in the corresponding UE. By receiving a context relocation request (or a context relocation request message, an application context relocation request, an application context relocation request message) from the UE (or EEC), the source EES may recognize that the procedure has been initiated in the EEC. The context relocation request may be transmitted from the UE to the source EES before step 0 or 1.

In step 2, the EEC in the UE may perform a registration procedure with the target EES. In case that the EEC does not perform a registration procedure, the EEC in the UE may notify the target EES that it has moved to a target EES service area through separate signaling.

Because the EEC has already transmitted a context relocation request to the source EES, the EEC does not immediately perform the same operation (operation of transmitting the context relocation request) to the target EES. That is, the EEC may not transmit the context relocation request to the target EES until it knows that the application context relocation procedure has failed or until a predefined timer is completed.

The EEC may transmit information on the relocation mode received from the source EES to the target EES through a registration procedure or a separate procedure.

In step 3, the target EES may transmit an EEC registration event notification to the source EES.

The target EES may include information capable of identifying the UE or the EEC in the UE to transmit an EEC registration notification to the source EES. For example, the information capable of identifying the EEC may include at least one of an EEC ID, a UE ID, a UE IP address, or an ID assigned from an authentication and authorization function.

In step 4, the source EES may coordinate the application context relocation procedure. The coordination of the application context relocation procedure that may be performed by the source EES may be exemplified as follows.

The source EES may identify that the UE has moved to a target EES service area and modify (coordinate) the application context relocation procedure as follows.

The source EES may not transmit application context relocation complete to the UE (e.g., the source EES may modify the context relocation procedure so as not to transmit, to the EEC, a response message to the context relocation request received in advance to the EEC). In a situation where communication between the source EES and the UE is impossible through such coordination, by preventing repetitive signal transmission, overhead may be reduced.

In step 5, the target EES may transmit application context relocation complete to the EEC. Because communication between the source EES and the UE is impossible, the target EES transmits application context relocation complete instead of the source EES to notify the UE that the application context relocation is completed.

The operations of the above steps 4 and 5 are summarized as follows.

The source EES may recognize the fact that the UE has moved to a service area of the target EES and modify the application context relocation procedure as follows.

The source EES may not transmit application context relocation complete to the UE (e.g., the source EES may modify the procedure so as not to transmit, to the EEC, a response message to the context relocation request received in advance to the EEC). In case that communication between the source EES and the UE is impossible through such coordination, by preventing transmission of repetitive signaling, overhead may be reduced.

The target EES may transmit application context relocation complete to the EEC instead of the source EES. Accordingly, the target EES may perform application function influence on traffic routing to perform rerouting for application data traffic instead of the UE. A detailed description thereof will be described below.

In step 6, the EEC may receive application context relocation complete from the target EES instead of the source EES, and perform re-routing for application data traffic. The UE may recognize that it will receive application context relocation complete from the target EES through the EEC registration procedure performed by moving to the service area of the target EES. In case that the target EES performs rerouting for application data traffic, the UE does not perform this operation (operation of performing rerouting for application data traffic).

Figure 5:
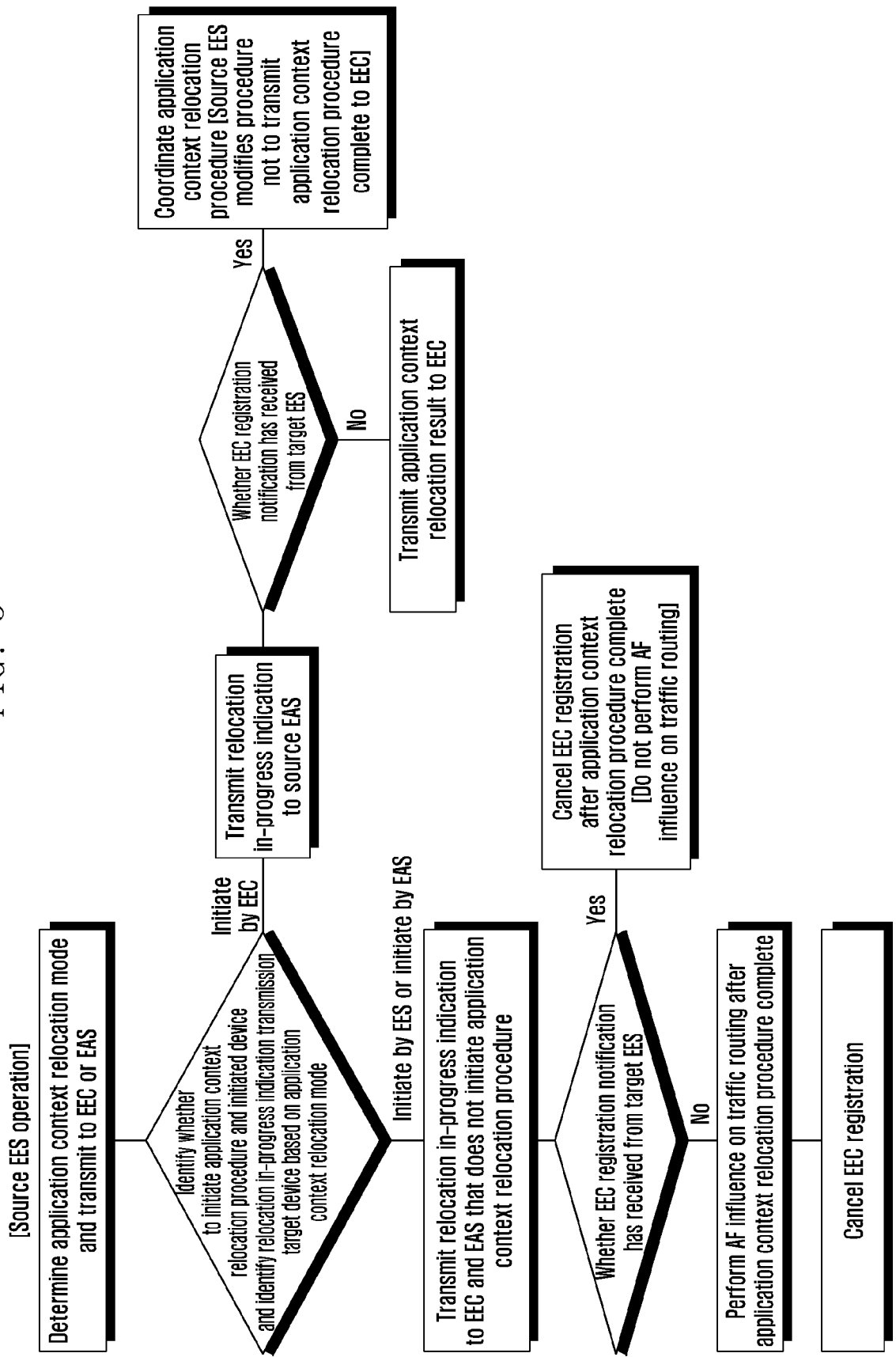
FIG. 5 is a flowchart illustrating an operation of a source EES according to an embodiment of the disclosure.

FIG. 5 is a message flow diagram illustrating an operation of a source EES according to an embodiment of the disclosure.

With reference to FIG. 5, the source EES may determine a relocation mode. Further, the source EES may transmit the determined relocation mode to the EEC and the EAS. Because a specific method of determining a relocation mode is the same as the above-described method, it will be omitted below.

A process of determining the relocation mode may be omitted. In case that the determination of the relocation mode is omitted (i.e., in case that the relocation mode is not determined), if the application context relocation procedure is initiated, the source EES may transmit a relocation in-progress indication to all devices. Alternatively, the relocation mode may be determined by each device, and in this case, a procedure for transmitting the relocation mode may also be omitted.

Thereafter, the source EES may identify whether an application context relocation procedure is initiated. Further, the source EES may determine a device that initiates the application context relocation procedure.

In case that the relocation mode is determined, the source EES may determine a device to transmit the relocation in-progress indication based on the determined mode.

1. Specifically, a case in which the device that initiates the application context relocation procedure is a source EES will be described.

In this case, the source EES may transmit the relocation in-progress indication to the determined device. For example, the source EES may transmit the indication to the EEC and the EAS that does not perform initiation of the application context relocation procedure.

The source EES may identify whether an EEC registration notification has been received from the target EES. In case that the notification is received, the source EES may perform an EEC de-registration procedure after completing application context relocation. Further, the source EES may not perform AF influence on traffic routing.

In case that the notification is not received, the source EES may perform AF influence on traffic routing after completing application context relocation. The source EES may perform an EEC de-registration procedure.

2. A case in which the device that initiates the application context relocation procedure is the EEC will be described.

In this case, the source EES may transmit a relocation in-progress indication to the source EAS. According to the indication, the source EAS may not initiate the application context relocation procedure.

The source EES may identify whether an EEC registration notification has been received from the source EES. In case that the notification is received, the source EES may coordinate the application context relocation procedure. That is, the source EES may identify the fact that the UE has moved to the target EES, and modify the procedure not to transmit application context relocation complete to the UE. Through such coordination, it is possible to prevent repetitive signaling transmission.

In case that the notification is not received, the source EES may transmit a result of the application context relocation to the EEC.

Figure 6:
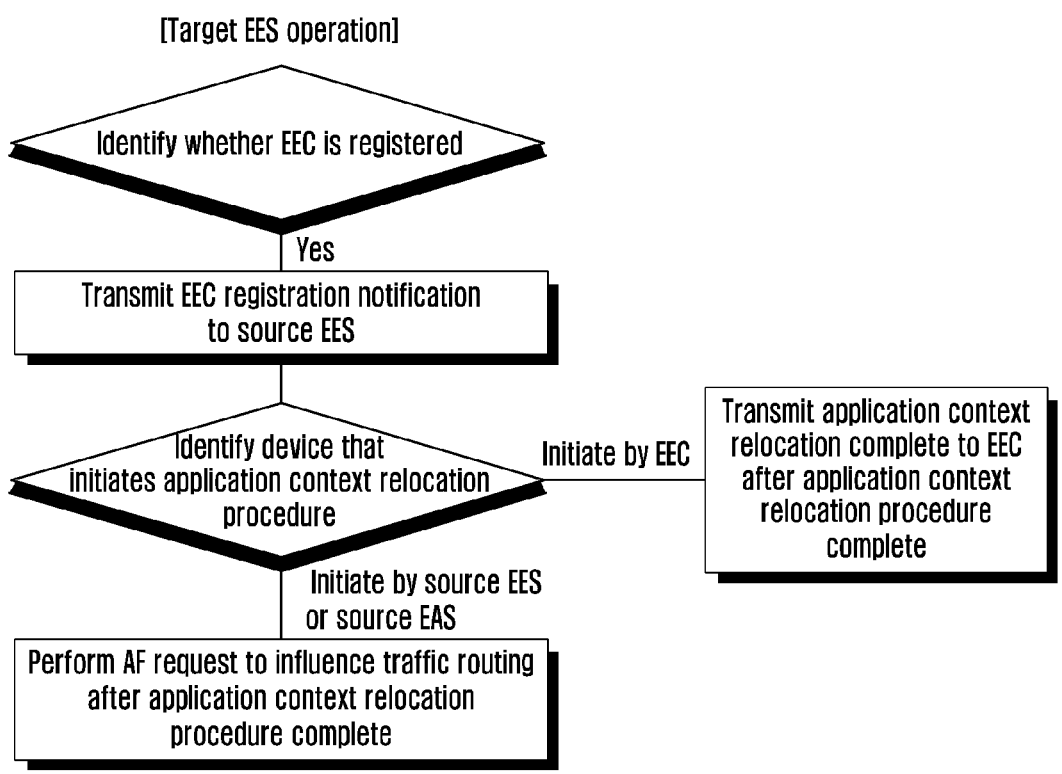
FIG. 6 is a flowchart illustrating an operation of a target EES according to an embodiment of the disclosure.

FIG. 6 is a message flow diagram illustrating an operation of a target EES according to an embodiment of the disclosure.

With reference to FIG. 6, the target EES may identify whether an EEC registration procedure is performed.

In case that the EEC registration procedure is performed, the target EES may transmit an EEC registration notification to the source EES.

The target EES may identify a device that initiates the application context relocation procedure. In case that the device is the EEC, the target EES may transmit an application context relocation complete notification message to the EEC after completing the application context relocation. In case that the UE cannot communicate with the source EES according to a movement of the UE, the target EES may transmit an application context relocation complete notification message to the UE instead of the source EES, thereby preventing repetitive signaling transmission.

In case that the device that initiates the application context relocation procedure is a source EES or a source EAS, the target EES may perform AF request to influence traffic routing after the application context relocation procedure is completed.

In addition to a deployment scenario of the above embodiments, an embodiment of a case in which communication between the UE and the source EES is guaranteed outside a service area of the source EES is as follows.

In case that the source EES initiates the application context relocation procedure, the source EES may transmit a relocation in-progress indication to all source EASs that provide services to the EEC of the UE and the UE. The source EES may select a device to transmit the relocation in-progress indication according to a relocation mode previously determined by the source EES before transmitting the relocation in-progress indication. Accordingly, there is no need to transmit an indication (relocation in-progress indication) to a device that will not perform the application context relocation procedure according to a condition of the mode. Because a detailed description of the relocation mode is the same as that described above, it will be omitted below.

Further, the relocation in-progress indication transmitting to the EEC may include information capable of identifying which application client of the UE context relocation is in progress. The relocation in-progress indication transmitting to the source EAS may include information (e.g., EEC ID, UE ID, UE IP address, or ID assigned from authentication and authorization function) that can identify the UE or the EEC in the UE. However, the identifier may not be included in the relocation in-progress indication.

In case that the source EAS providing a service to the UE initiates the application context relocation procedure, the source EES may transmit a relocation in-progress indication to another source EAS providing a service to the EEC of the UE and the UE. The relocation in-progress indication transmitting to the EEC may include information capable of identifying which application client of the UE context relocation is in progress.

The relocation in-progress indication transmitting to the source EAS may include information (e.g., EEC ID, UE ID, UE IP address, or ID assigned from an authentication and authorization function, and the like) capable of identifying the UE or the EEC.

In case that the UE initiates the application context relocation procedure and the source EES receives a context relocation request from the UE, the source EES may transmit a relocation in-progress indication to the source EAS providing a service to the UE.

Figure 7:
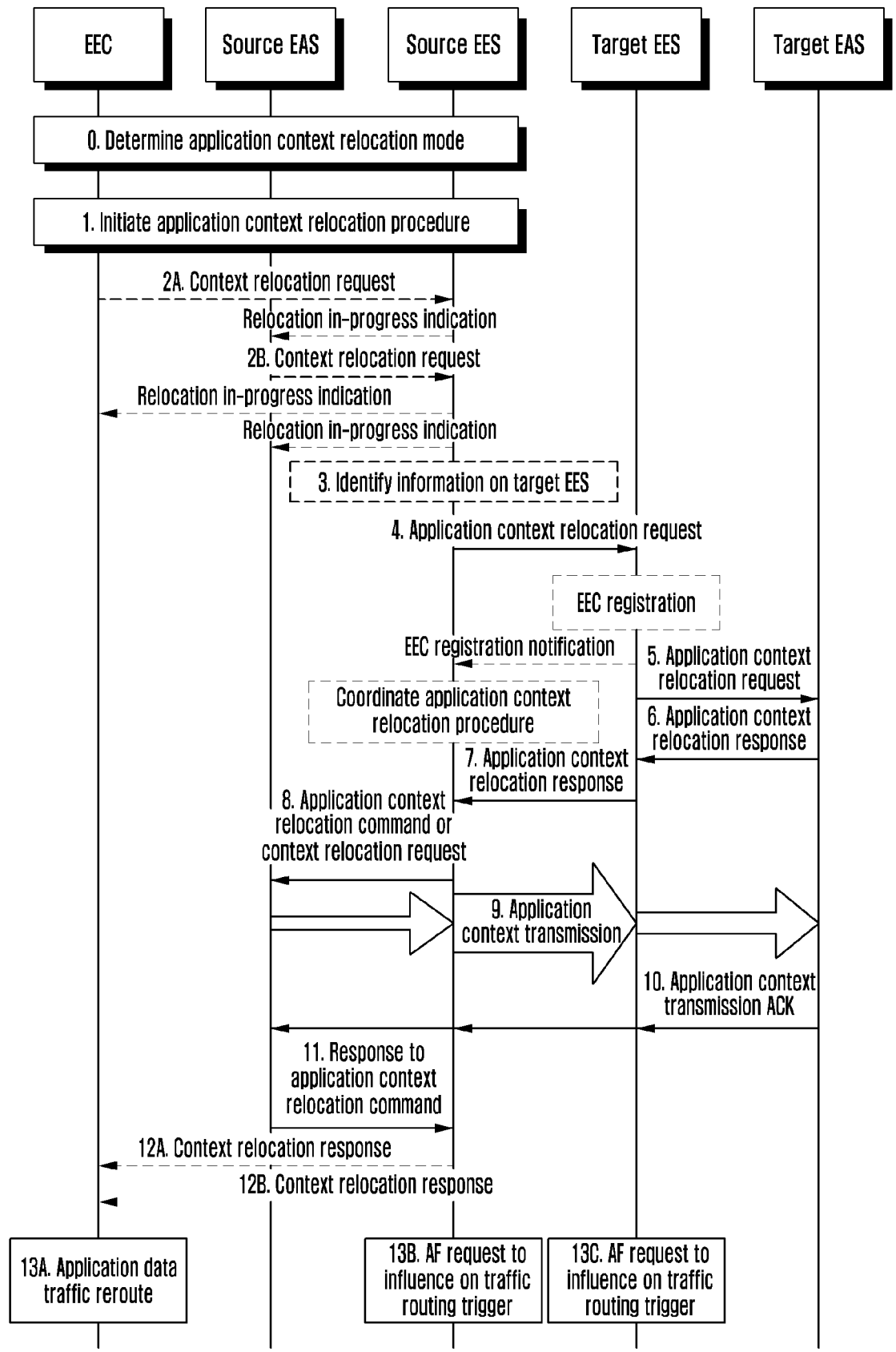
FIG. 7 is a message flow diagram illustrating operations that may be performed for coordination in an application context relocation procedure according to an embodiment of the disclosure.

FIG. 7 is a message flow diagram illustrating operations that may be performed for coordination in an application context relocation procedure according to the disclosure.

FIG. 7 illustrates an embodiment of a specific operation of a source EES based application context relocation procedure (a procedure in which devices in a source edge data network initiate an application context relocation procedure) according to the above-described embodiments.

In step 0, the source EES may determine a relocation mode, and transmit the relocation mode to the EEC and the source EAS. A detailed description thereof is the same as that described above and will be omitted below. Further, according to the embodiment, step 0 may be omitted.

In step 1, the application context relocation procedure may be initiated. The application context relocation procedure may be initiated (or triggered) in the EEC, source EAS, and source EES, respectively.

In case that the application context relocation procedure is initiated or triggered in the EEC or the source EAS, the source EES may receive a context relocation request from the EEC (step 2A) or may receive a context relocation request from the source EAS (step 2B). Further, the source EES may directly perform an operation of initiating an application context relocation procedure. In this way, in case that the source EES receives the context relocation request or in case that the source EES directly initiates the application context relocation procedure, the source EES may transmit a relocation in-progress indication to another device. In this case, the source EES may determine a device (EEC or source EAS) to transmit the relocation in-progress indication based on the determined relocation mode. Alternatively, in case that the relocation mode is not determined, the source EES may transmit the indication to all devices.

The source EES may obtain target EES information in step 3, and transmit an application context relocation request to the target EES in step 4.

After receiving the application context relocation request from the source EES (after step 4), when the EEC registration procedure is performed, the target EES may transmit an EEC registration notification to the source EES. The notification may include information capable of identifying the UE or the EEC in the UE.

Upon receiving the EEC registration notification, the source EES may modify the ongoing application context relocation procedure. Specifically, the source EES may identify that communication with the EEC is no longer possible, and may not perform transmission of application context relocation complete and AF influence on traffic routing.

The operation of the source EES may be performed by the target EES, or some operations (application data traffic re-routing) may be performed by the EEC in the UE.

Specifically, the target EES may transmit the application context relocation complete (or response) to the UE in step 12B. In case that the source EES does not receive an EEC registration notification from the target EES, the source EES may transmit application context relocation complete (or response) to the EEC in step 12A.

Further, the source EES or the target EES may trigger an AF request to influence on traffic routing in step 13B or 13C. A detailed description thereof is the same as that described above and will be omitted below.

Figure 8:
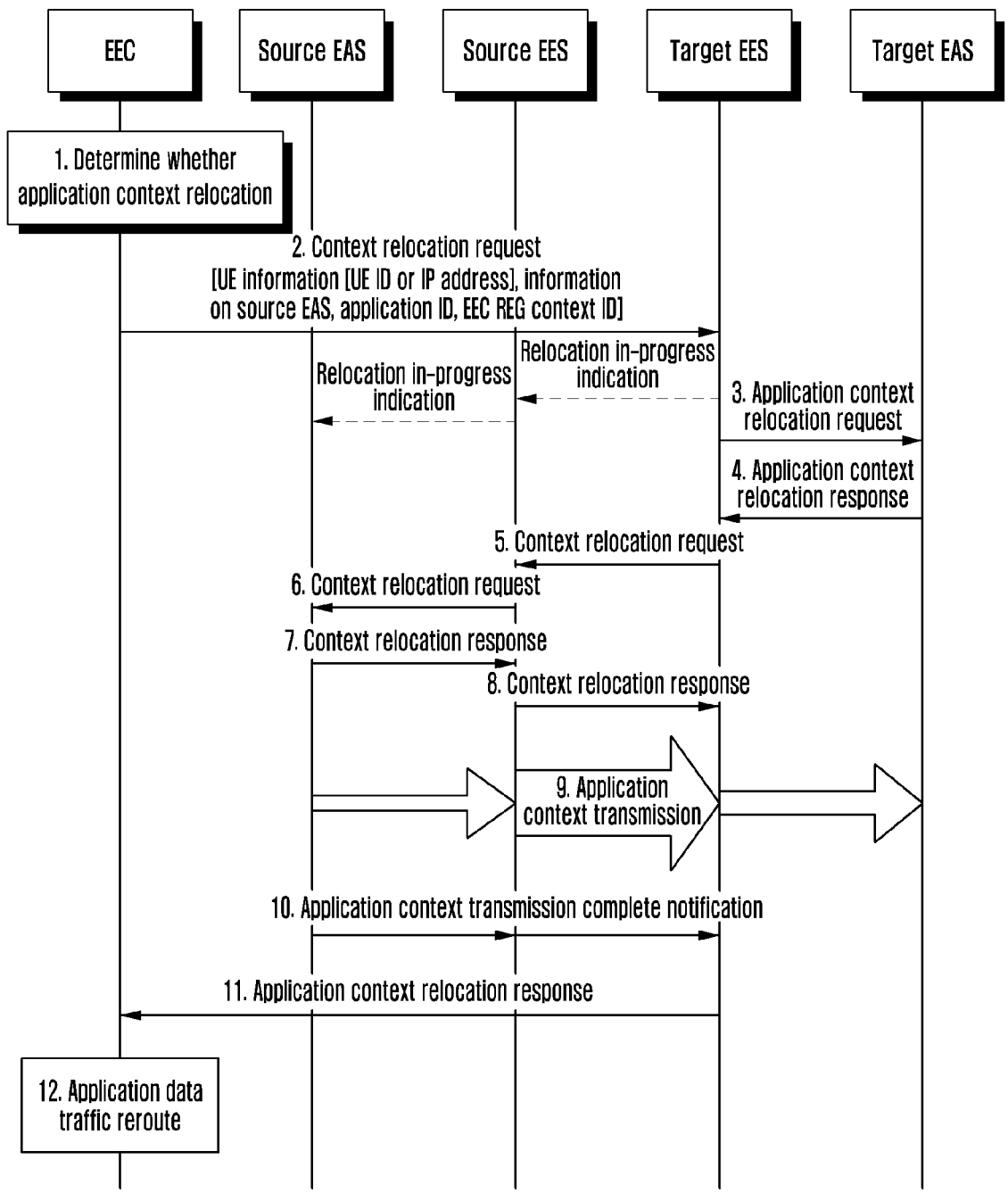
FIG. 8 is a message flow diagram illustrating operations that may be performed for coordination in an application context relocation procedure according to an embodiment of the disclosure.

FIG. 8 is a message flow diagram illustrating operations that may be performed for coordination in an application context relocation procedure according to the disclosure.

FIG. 8 illustrates an embodiment of a detailed operation of the above-described embodiments for a target EES based application context relocation procedure (a procedure initiated by an EEC in a UE, an application client, or an MT and sending an application context relocation request to the target EES).

The EEC may determine whether to initiate an application context relocation procedure in step 1, and in case that it is determined to initiate the application context relocation procedure, the EEC may transmit an application context relocation request to the target EES in step 2. In this case, the application context relocation request may include at least one of UE information (e.g., UE ID or IP address), S-EAS information, application information, or EEC registration context ID. Further, the application context request may also include information on the relocation mode. However, the information may be omitted.

After the target EES receives the application context relocation request from the EEC (after step 2), the target EES may transmit a relocation in-progress indication to the source EES to which the corresponding UE has been connected.

As described above, the EEC may provide, to the target EES, information on a relocation mode received from the source EES, and the target EES may determine a device to transmit the relocation in-progress indication using the information (information on the relocation mode) (e.g., the target EES may determine whether to transmit the indication to the source EES using the information). For example, according to the corresponding mode, in case that only the UE may initiate the application context relocation procedure, the target EES may not transmit the relocation in-progress indication to the source EES.

The relocation in-progress indication may include information (e.g., EEC ID, UE ID, UE IP address, or ID assigned from an authentication and authorization function, and the like) capable of identifying the UE or the EEC in the corresponding UE. The source EES may transmit the corresponding relocation in-progress indication to the source EAS providing a service to the UE.

As another embodiment, the relocation in-progress indication may be included in the application context relocation request of steps 5 and 6 of FIG. 8 to be transmitted to the source EES and the source EAS. Whether to include and transmit the corresponding indication may be determined according to information on the relocation mode provided from the EEC, as in the above-described embodiment.

Figure 9:
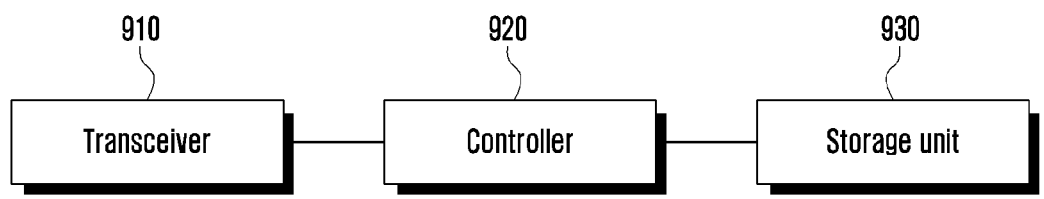
FIG. 9 is a block diagram illustrating a structure of a server according to the disclosure.

FIG. 9 is a block diagram illustrating a structure of a server according to the disclosure.

With reference to FIG. 9, the server may include a transceiver 910, a controller 920, and a storage unit 930. In the disclosure, the controller may be defined as a circuit, an application specific integrated circuit, or at least one processor.

In this case, the server may correspond to at least one of an EES, EAS, or edge data network configuration server.

The transceiver 910 may transmit and receive signals to and from other network entities. The transceiver 910 may transmit and receive information to and from, for example, another server through a specific interface.

The controller 920 may control overall operations of the server according to an embodiment proposed in the disclosure. For example, the controller 920 may control a signal flow between blocks so as to perform an operation according to the above-described flowchart.

The storage unit 930 may store at least one of information transmitted and received through the transceiver 910 or information generated through the controller 920.

Figure 10:
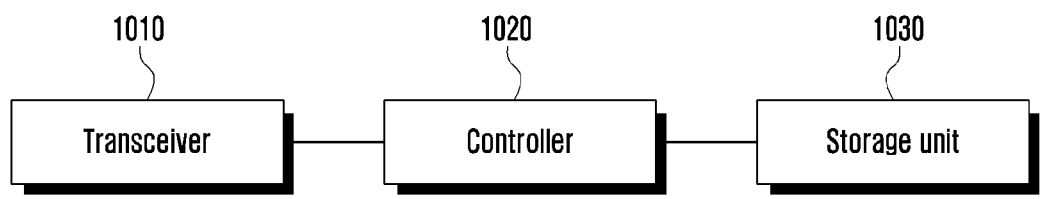
FIG. 10 is a block diagram illustrating a structure of a terminal according to the disclosure.

FIG. 10 is a block diagram illustrating a structure of a UE according to the disclosure.

With reference to FIG. 10, the UE may include a transceiver 1010, a controller 1020, and a storage unit 1030. In the disclosure, the controller may be defined as a circuit, an application specific integrated circuit, or at least one processor.

The transceiver 1010 may transmit and receive signals to and from other network entities.

The controller 1020 may control overall operations of the server according to an embodiment proposed in the disclosure. For example, the controller 1020 may control a signal flow between blocks so as to perform an operation according to the above-described flowchart.

The storage unit 1030 may store at least one of information transmitted and received through the transceiver 1010 or information generated through the controller 1020.

The disclosure proposes a method of performing coordination in an application context relocation procedure that may be initiated from a plurality of devices, thereby enabling to select an optimal device for initiation of the application context relocation procedure and reducing a signaling overhead.

For the above purpose, the disclosure provides a method of performing coordination of an application context relocation procedure between a UE (or EEC in a UE), EAS, and EEC.

Further, the disclosure proposes a method of notifying each of the EAS and the UE (or the EEC in the UE) of a capability to initiate an application context relocation procedure (application context relocation initiation capability) to the EAS.

Further, the disclosure proposes a method of notifying another device (e.g., EEC, EES, EAS, and the like) of information on the progress of an application context relocation procedure initiated in one device.

The above-described edge computing system may obtain information necessary for providing an edge computing service to a UE through a 3GPP system. To this end, the EES subscribes to a network exposure function (NEF), which is one of 3GPP network functions (NFs), and the NEF subscribes to receive information on a target UE from other 3GPP NFs, thereby receiving information on the UE from the 3GPP system. In case that the UE moves, overhead that should repeatedly subscribe/unsubscribe so as to obtain the information may occur in the 3GPP system. Hereinafter, in order to solve the overhead problem, a method capable of minimizing the repetition of a subscription/unsubscription configuration between a 3GPP NF that exposes UE related information to an edge computing device (e.g., EES) and a 3GPP NF that provides UE related information will be described.

Figure 11:
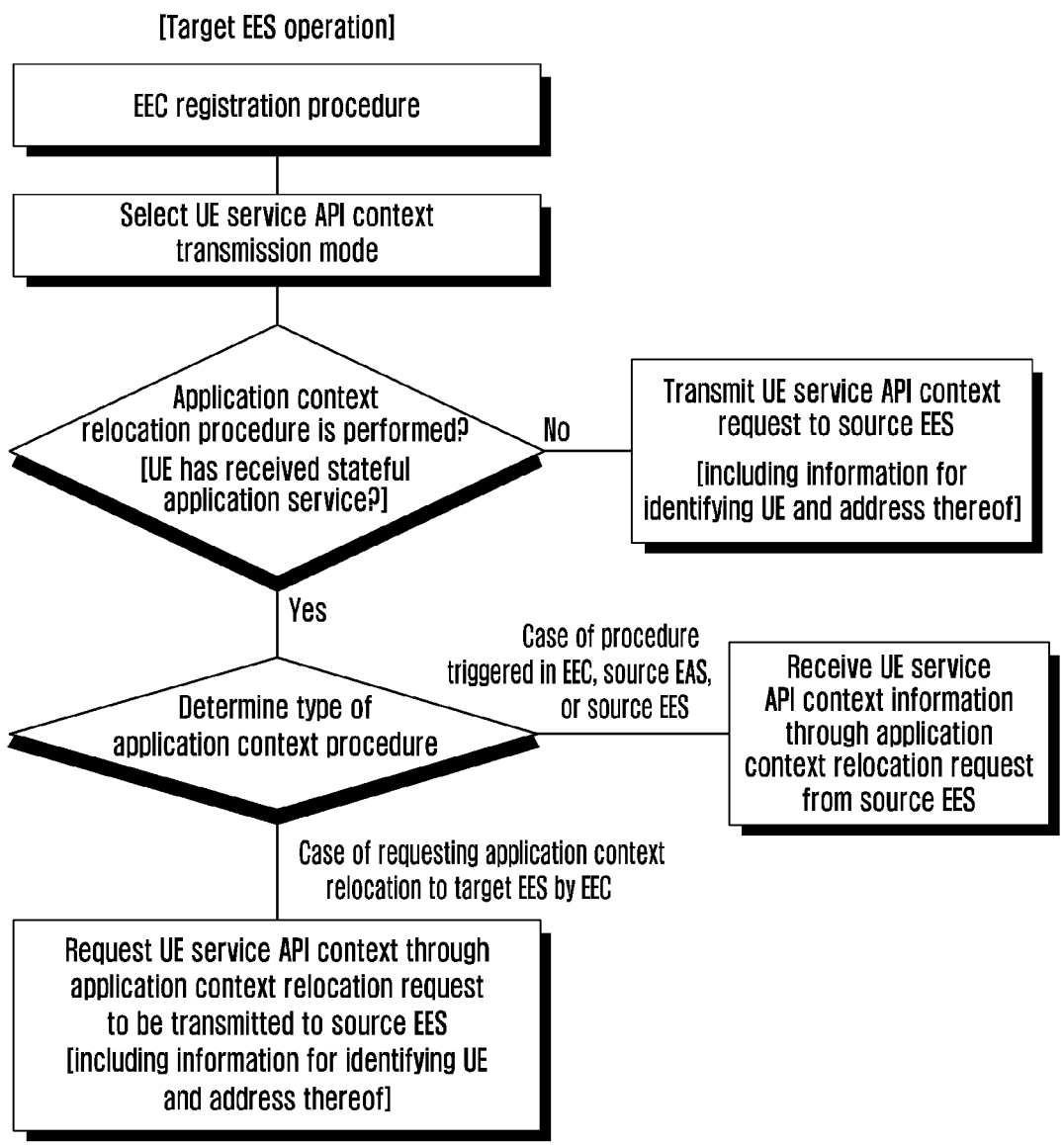
FIG. 11 is a flowchart illustrating a method of transferring a UE service API context according to an embodiment of the disclosure.

FIG. 11 is a flowchart illustrating a method of transferring a UE service API context according to an embodiment of the disclosure.

When performing an EEC registration procedure with the UE, if source EES related information is provided from the UE, the target EES may determine that UE service API context information transfer is necessary.

Source EES information (or source server information) provided by the UE through the EEC registration procedure may include only an identifier of the source server (source EES) or address information of the source server (source EES). Further, the source server information may include both an identifier of the source server and address information of the source server, and include at least one of various information necessary for data transmission and reception between the source server and the UE (e.g., source EAS information (identifier and address information) that has provided a service to the application client in the UE, an application client identifier and related information that has been receiving the edge computing service, and UE service API information required to provide an edge computing service to the application client).

If only the identifier is provided, the target EES should receive address information of the source EES from the edge data network configuration server.

Accordingly, the target EES may determine characteristics of the application being provided to the UE. Specifically, the target EES may identify whether the UE was using a stateful application service. In this case, the stateful application service may mean an application service that requires continuous operation state information of a client and a server in order to provide a seamless service, and include, for example, the above-described real-time interactive game application. That is, the target EES may identify whether an application context relocation procedure is performed (or whether it is necessary). This may be determined based on whether the target EES has received an application context relocation request from the source server. However, embodiments of the disclosure are not limited thereto, and specific examples will be described later.

In case that the UE was using the stateless application service, a standalone procedure of various embodiments of the UE service API context transfer method of FIG. 12 to be described later may be performed.

Because the UE is receiving a stateful application service, in case that the application context relocation procedure needs to be performed, the application context relocation procedure may be applied as one of various embodiments of the UE service API context transfer method. A detailed description of the various embodiments will be described later.

Specific examples in which the UE determines received application service characteristics (stateful or stateless) are as follows:

The UE (EEC) may determine application service characteristics based on EAS service profile information that provides a requested service, or The UE may determine application service characteristics based on provided source EAS information, or The UE may determine application service characteristics according to whether an application context relocation request is received.

However, the embodiment of the disclosure is not limited thereto, and various methods of determining characteristics of the application service may be used.

The scope of the disclosure is not limited to the above-described embodiments. That is, when a condition for performing an operation according to each embodiment is satisfied without a process of determining characteristics of the application, the target server may perform the corresponding operation. For example, after performing a registration procedure of the UE, the target server may perform procedures corresponding to various embodiments of the disclosure. As another example, in case that performing an application context relocation procedure, the target server may perform a procedure corresponding to various embodiments of the disclosure.

Figure 12:
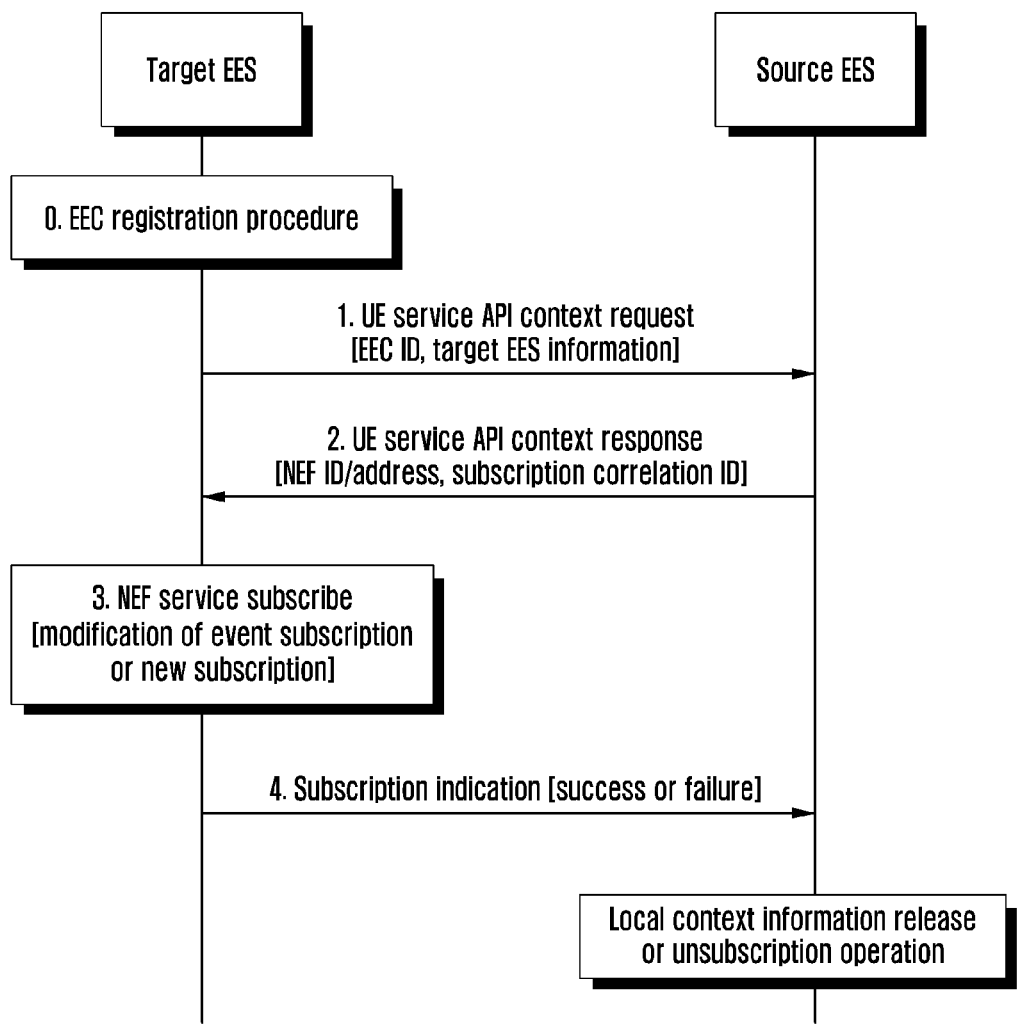
FIG. 12 is a message flow diagram illustrating a method of transferring a UE service API context according to an embodiment of the disclosure.

FIG. 12 is a message flow diagram illustrating a method of transferring a UE service API context according to an embodiment of the disclosure.

With reference to FIG. 12, the EEC of the UE may perform an EEC registration procedure with the target EES to which the UE has moved (step 0). When performing the registration procedure, the UE may provide at least one of a source EES ID or address information of the source EES (e.g., a fully qualified domain name (FQDN), an IP address, and the like). This is for the target EES to identify the source EES and transmit a UE service API context request.

The target EES may perform an operation of finding an address of the source EES based on information received from the EEC of the UE. For example, the target EES may receive an address of the source EES from an edge data network configuration server through a query. Alternatively, information on an address of the source EES may be stored in the target EES, and the target EES may find the address of the source EES based on information received from the UE.

The target EES may transmit a UE service API context request to the identified source EES (step 1).

The UE service API context request may include at least one of the following information.

EEC ID of the UE that has performed a registration procedure to itself: The identifier may be an identifier provided from the authentication authorization function while the UE performs authentication/authorization or an ID (EEC registration context ID) given by the source EES in the EEC registration procedure. Further, at least one of an identifier that can identify a UE other than the EEC ID (e.g., identifier information such as a generic public subscription identifier (GPSI)) or a UE IP address may be transmitted together or at least one of an identifier that may identify a UE instead of the EEC ID or a UE IP address may be transmitted.

Target EES information: at least one of a target EES FQDN, a target EES IP address, a target EES ID, or edge computing service provider information (e.g., ECSP ID) may be included EAS information (application ID, EAS ID, EAS category, and the like) that has provided a service to the UE by the target EES.

The source EES may identify UE related information provided from the EAS and the 3GPP system that have provided the service to the UE based on information received from the target EES. The source EES may transmit information on a 3GPP NF (e.g., NEF or SCEF) that has exposed information related to the corresponding UE based on the identified information to the target EES. The source EES may transmit a response message (UE service API context response) including related UE service API context information to the target EES (step 2).

The UE service API context information may include at least one of information such as an NEF ID/address, a subscription correlation ID, or a notification correlation ID.

The subscription correlation ID is an identifier for subscription information between a consumer NF and a provider NF (e.g., information on which UE, providing information, subscription between what devices, and information on NFs related to provide information). A subscription correlation ID may be used for specifying a subscription to be modified. The event provider NF (e.g., NEF) may provide the subscription correlation ID to the consumer NF (e.g., EES or EAS).

A subscription correlation ID is needed to find an NEF that should perform subscription using the NEF ID/address and to identify the subscription performed for the UE between the NEF and the source EES. After completing identification of the NEF and the modification target subscription, by performing a subscription operation for the target NEF, the target EES may modify the subscription between the NEF and the source EES.

The target EES may perform the following operation based on UE service API context information received by the source EES (Step 3).

Case 1: In case that the NEF to which the source EES subscribes is an NEF to which the target EES may subscribe (determine based on the NEF ID/address received from the source EES)
  Subscribe to the target NEF based on at least one of a subscription ID, a notification target address (target EES information), or a notification correlation ID received from the source EES.
  The NEF identifies subscription related information with the existing source EES based on the subscribe correlation ID included in a subscription request message of the target EES. The NEF may change the notification target address from the source EES address to the target EES address. That is, the NEF may maintain a southbound interface related configuration between the NEF and the NF (e.g., access and mobility management function (AMF), session management function (SMF), and policy control function (PCF)) of the 3GPP system, and change a northbound API configuration (e.g., EES as an application function of the 3GPP system) that exposes to an upper application layer. A northbound API refers to an interface that the NEF exposes to an application function (e.g., EES, EAS) of an upper layer (application layer). A southbound interface refers to a lower layer (lower layer than the application layer) interface between the NEF and the NF (e.g., AMF, SMF, PCF, and the like) of the 3GPP system.

Case 2: In case that the NEF to which the source EES subscribes is an NEF to which the target EES cannot subscribe (determine based on the NEF ID/address received from the source EES)
  The target EES performs a new subscription to the NEF to which it subscribes and is linked.
  The target EES may provide UE identification information to the NEF so as to specify the UE. The UE identification information may be a GPSI, an external ID, a UE IP address, or the like.

The target EES may transmit a subscription result (subscription indication) according to step 3 to the source EES (step 4). Upon successful subscription (step 3, case 1), the source EES may delete locally stored UE service API context related information and perform de-registration for the UE (EEC). Further, the source EES may not perform an unsubscription request to the NEF (step 5).

Upon a subscription failure (step 3, case 2), the source EES may perform an unsubscription request to the NEF.

A detailed step 5 operation is as follows.
Case 1: The target EES successfully subscribes to the NEF
  Delete UE service API context information stored in the source EES.
  Perform an EEC de-registration procedure.
  Do not perform an unsubscription operation to the NEF.
Case 2: The target EES fails to subscribe to the NEF sent by the source EES.
  The source EES performs an unsubscription operation for the corresponding UE to the NEF.

Figure 13:
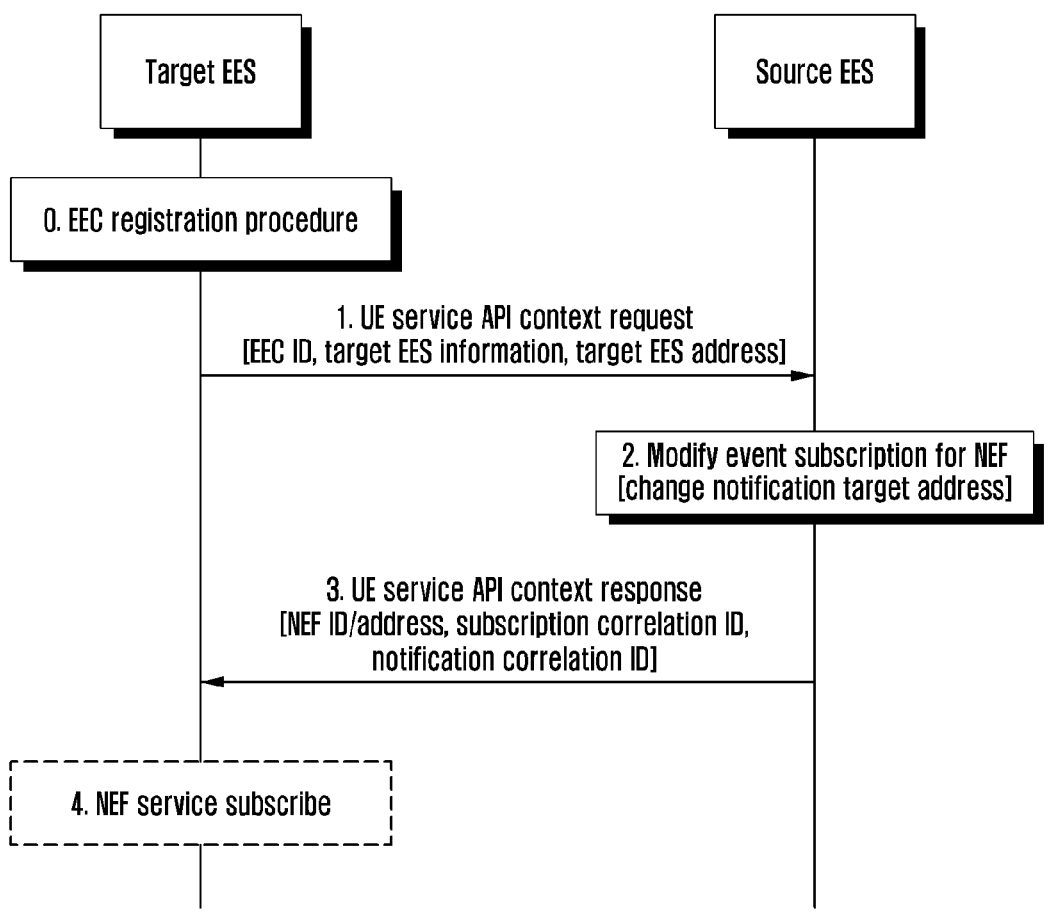
FIG. 13 is a message flow diagram illustrating a method of transferring a UE service API context according to an embodiment of the disclosure.

FIG. 13 is a message flow diagram illustrating a method of transferring a UE service API context according to an embodiment of the disclosure.

With reference to FIG. 13, the EEC of the UE may perform an EEC registration procedure with the target EES to which the UE has moved (step 0). When performing the registration procedure, the UE may provide at least one of a source EES ID or address information (e.g., FQDN, IP address, and the like) of the source EES. This is for the target EES to identify the source EES and transmit a UE service API context request.

The target EES may perform an operation of finding an address of the source EES based on information received from the EEC of the UE. For example, the target EES may receive an address of the source EES from an edge data network configuration server through a query. Alternatively, information on the address of the source EES may be stored in the target EES, and the address of the source EES may be found based on information received from the UE.

The target EES may transmit a UE service API context request to the identified source EES (step 1).

The UE service API context request may include at least one of the following information.
  EEC ID of the UE that has performed a registration procedure to itself: The identifier may be an identifier provided from the authentication authorization function while the UE performs authentication/authorization or an ID (EEC registration context ID) given by the source EES in the EEC registration procedure). Further, at least one of an identifier (e.g., identifier information such as a generic public subscription identifier (GPSI)) that can identify a UE other than the EEC ID or a UE IP address may be transmitted together or at least one of an UE IP address or an identifier that may identify a UE instead of the EEC ID may be transmitted.
  Target EES information: At least one of a target EES FQDN, a target EES IP address, a target EES ID, or edge computing service provider information (e.g., ECSP ID) may be included. In this case, target EES address information that may be used as a notification target address of the NEF of the 3GPP system may be included.
  EAS information (application ID, EAS ID, EAS category, and the like) that has provided a service to the UE by the target EES.
  NEF information to which the target EES subscribes or NEF information (NEF ID/address) in which the target EES may use Thereafter, the source EES may identify whether the NEF in which the target EES may use is an NEF to which it subscribes for the corresponding UE based on information received from the target EES (step 2).
  In case that the NEF is an NEF to which the source EES subscribes and has been used, the source EES may identify UE related information provided from the EAS and the 3GPP system that have provided a service to the UE, and find a related subscription correlation ID. The source EES may modify the subscription for a 3GPP NF (e.g., NEF or SCEF) that has exposed information related to the corresponding UE based on the identified information. Further, the source EES may modify a notification target address to the target EES address and store the related notification correlation ID.
  In case that the NEF is not an NEF to which the source EES subscribes and has been used, the source EES transmits a modification failure message to the target EES through the following step 3.

The source EES may transmit a response message (UE service API context response) including UE service API context information to the target EES (step 3). The UE service API context information may include information on the modified subscription. The response message may include an indication that may represent a subscription modification result.

The UE service API context information may include at least one of information such as an NEF ID/address, a subscription correlation ID, a notification correlation ID, a notification target address, or an event ID. The subscription correlation ID is necessary for supporting management operations such as modification and deletion of the corresponding subscription, and an event provider NF (e.g., NEF) may be provided to a consumer NF (e.g., EES or EAS).

The target EES may perform the following operations based on UE service API context information received from the source EES and the subscription modification result.

Case 1: Successful subscription modification (in case that the NEF to which the source EES subscribes is an NEF to which the target EES may subscribe)

Store UE service API context information (e.g., at least one of subscription ID, notification target address (target EES information), or notification correlation ID) received from the source EES.

Case 2: Subscription modification failure (in case that the NEF to which the source EES subscribes is an NEF to which the target EES cannot subscribe)

The target EES performs a new subscription to the NEF to which it subscribes and is linked.

The target EES may provide UE identification information to the NEF so as to specify the UE. The UE identification information may be a GPSI, an external ID, a UE IP address, or the like.

Figure 14:
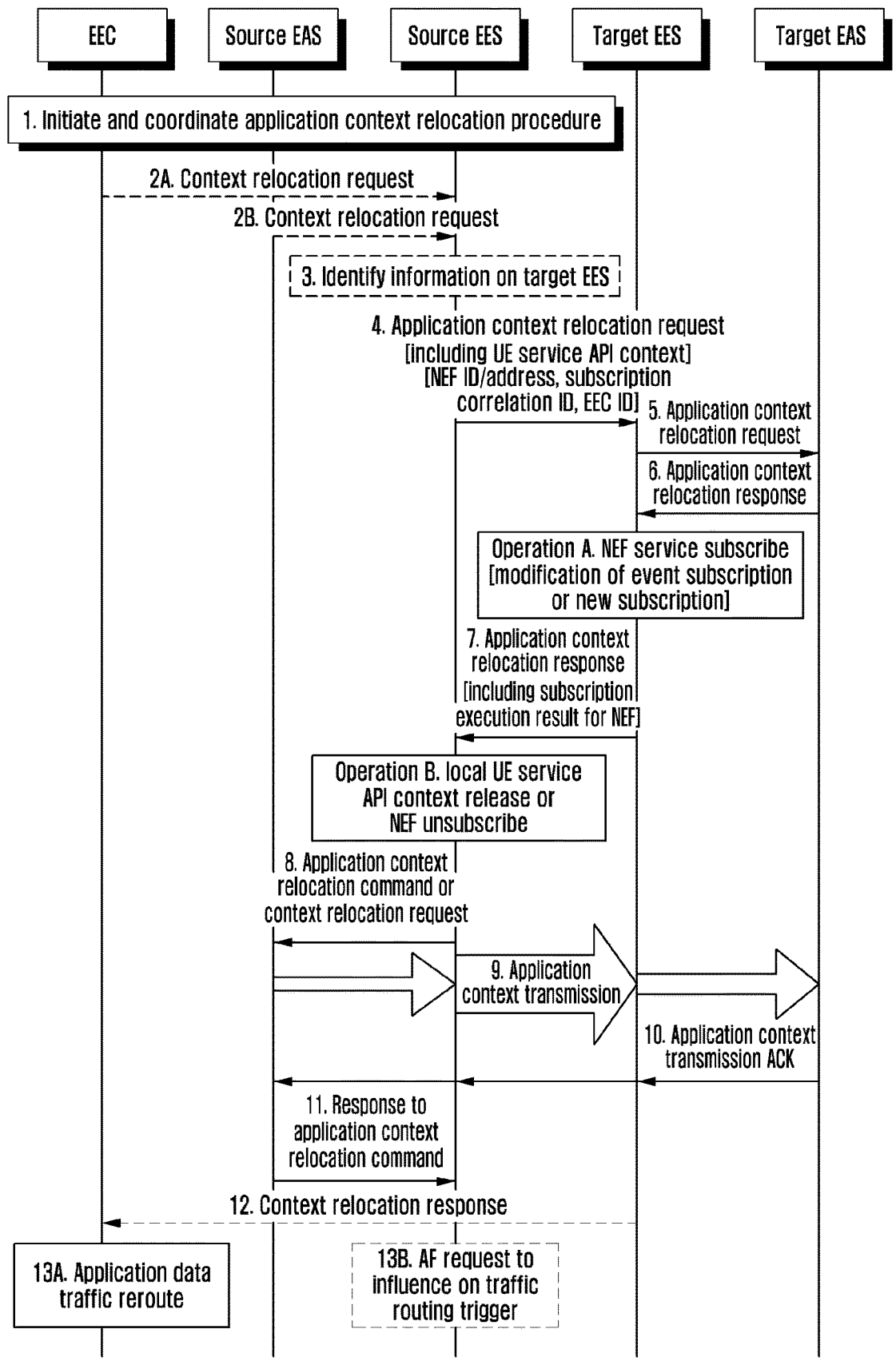
FIG. 14 is a message flow diagram illustrating a method of transferring a UE service API context according to an embodiment of the disclosure.

FIG. 14 is a message flow diagram illustrating a method of transferring a UE service API context according to various embodiments of the disclosure.

FIG. 14 illustrates a source EES based application context relocation procedure.

In order to support a UE using a stateful application service through the corresponding procedure, the source EES transmits application context information stored in a source EAS providing the service to the UE to the target EAS.

In the above process, the source EES may transmit an application context relocation request to the target EES. The disclosure proposes a method of performing UE service context API transfer without performing the separate procedure of FIGS. 11 to 13 by transmitting UE service API context information together when transmitting the application context relocation request. A specific method thereof is as follows. The procedure of FIG. 14 may be performed according to the above-described procedure of FIG. 11 or may be performed when a procedure for supporting a UE using a stateful application service is performed.

Because a detailed description of steps 1 to 3 is the same as that described above, it will be omitted here.

By adding at least one of the following information to the application context relocation request, the source EES may transmit the application context relocation request.

At least one of an NEF ID/address, a subscription correlation ID (reference ID that can specify the subscription of the source EES to the NEF for the target UE), an EEC ID, or an EEC registration context ID Thereafter, the target EES may transmit an application context relocation request to the target EAS in step 5, and receive an application context relocation response in step 6.

The target EES may subscribe to the NEF in operation A (subscribe to NEF)

If the NEF indicated by the source EES is an NEF to which the target EES can subscribe, by performing the subscription using the subscription correlation ID, the target EES may modify the subscription between the NEF and the source EES.

If the NEF indicated by the source EES is an NEF to which the target EES cannot subscribe, the target EES performs a new subscription operation for the target UE to the NEF to which the target EES subscribes. The target EES may provide at least one information of a GPSI, an external ID, or a UE IP address to the NEF so as to specify the target UE.

The target EES may transmit an application context relocation response to the source EES in step 7. A subscription result for the NEF (result of operation A: whether the target EES may subscribe to the NEF connected to the source EES) may be included in the application context relocation response.

Accordingly, in operation B, the source EES may perform the following operation according to a subscription indication of the target EES.

Case 1: The target EES successfully subscribes to the NEF indicated by the source EES.

Deletes UE service API context information stored in the source EES.

Perform an EEC de-registration procedure.

Do not perform an unsubscription operation to the NEF.

Case 2: The target EES fails to subscribe to the NEF indicated by the source EES.

The source EES performs an unsubscription operation for the corresponding UE to the NEF.

Figure 15:
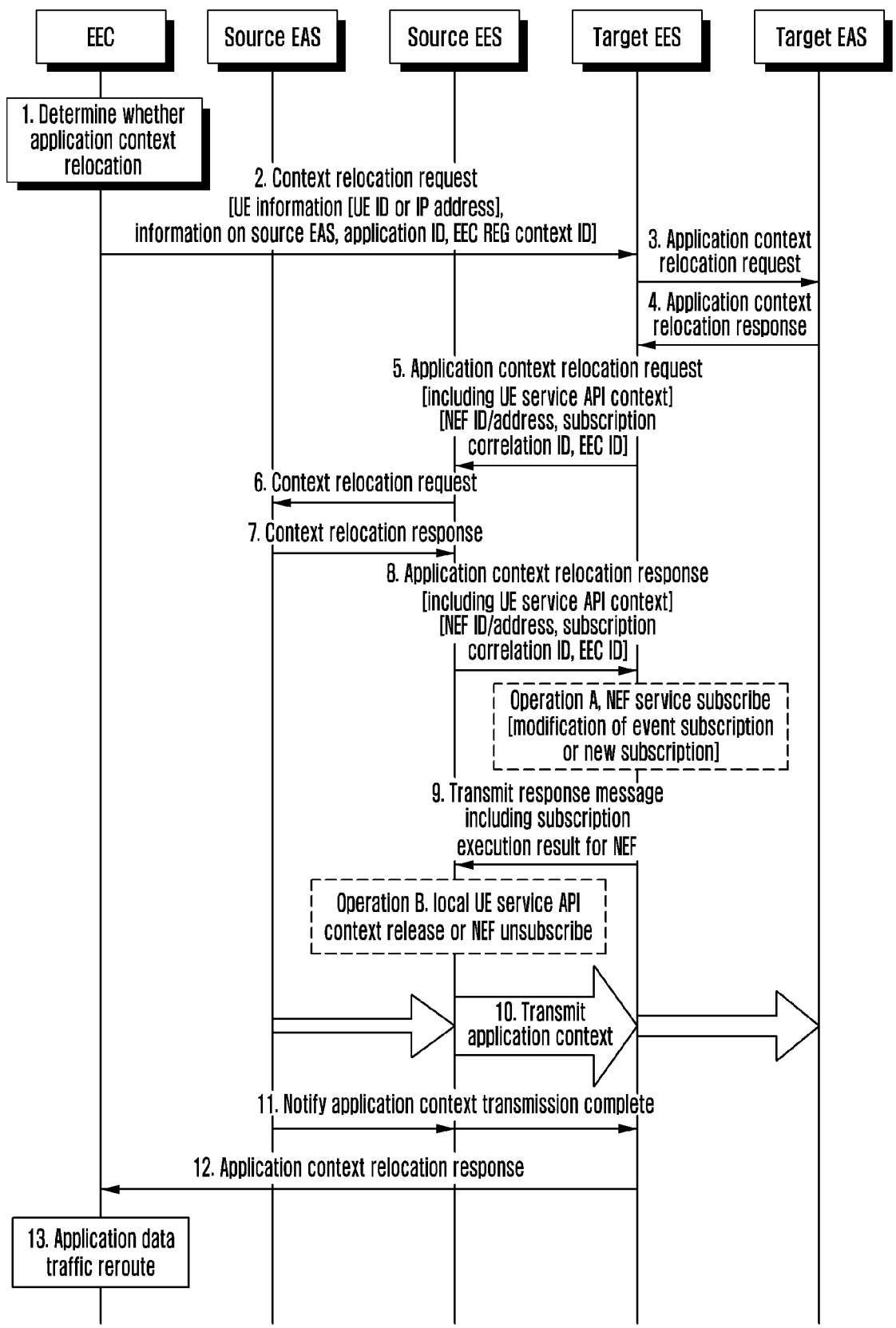
FIG. 15 is a message flow diagram illustrating a method of transferring a UE service API context according to an embodiment of the disclosure.

FIG. 15 is a message flow diagram illustrating a method of transferring a UE service API context according to an embodiment of the disclosure.

Steps 1 to 4 are processes in which the target EES receives an application context relocation request from the EEC of the UE and transmits and receives the application context relocation request to and from the target EAS accordingly, and a detailed description thereof will be omitted.

The target EES may transmit an application context relocation request to the source EES in step 5. In this case, the target EES may include and transmit the UE service API context request in the application context relocation request. The target EES may search for an address of the source EES based on information received from the EEC of the UE to transmit the request message. Alternatively, the target EES may receive an address of the source EES from the edge data network configuration server through a query. The UE service API context request may include at least one of the following information.

Information that can identify the UE or EEC that has performed a registration procedure to itself EEC ID: The corresponding identifier may be an identifier provided from the authentication authorization function while the UE performs authentication/authorization or an ID (EEC registration context ID) given in the EEC registration procedure in the source EES.

At least one of information such as a GPSI, external ID, or UE IP address that can identify the UE may be transmitted together, or at least one of an UE IP address or an identifier that can identify the UE instead of an EEC ID may be transmitted.

Target EES information: at least one of a target EES FQDN, a target EES IP address, a target EES ID, or edge computing service provider information (e.g., ECSP ID).

EAS information (application ID, EAS ID, EAS category, and the like) in which the target EES has provided a service to the UE Thereafter, the source EES may transmit an application context relocation request to the source EAS in step 6, and receive an application context relocation response in step 7.

The source EES may transmit an application context relocation response to the target EES in step 8. In this case, the source EES may include and transmit UE service API context information in the application context relocation response.

The source EES may identify UE related information provided from the EAS and the 3GPP system that have provided the service to the UE based on the information received from the target EES. The source EES may transfer information on a 3GPP NF (e.g., NEF or SCEF) that has exposed information related to the corresponding UE based on the identified information. The source EES may transmit a response message including related UE service API context information to the target EES.

The UE service API context information may include at least one of information such as an NEF ID/address, a subscription correlation ID, or a notification correlation ID.

The target EES may subscribe to an NEF in operation A (subscribe to NEF service). In this case, the target EES may operate based on the UE service API context information received in step 8. A specific operation thereof is as follows.

Case 1: In case that the NEF to which the source EES subscribes is an NEF to which the target EES may subscribe (determine based on the NEF ID/address received by the source EES)

Subscribe to the NEF including at least one of the subscription ID or notification target address (target EES information) received by the source EES. Additionally, a notification correlation ID may be included.

The NEF may identify subscription related information with an existing source EES based on the subscription correlation ID in the subscription request of the target EES. The NEF may change the notification target address from the source EES address to the target EES address. That is, the NEF may maintain a southbound configuration (interface) and change a northbound API configuration (interface).

Case 2: In case that the NEF to which the source EES subscribes is an NEF to which the target EES cannot subscribe (determine based on the NEF ID/address received by the source EES)

The target EES performs a new subscription to the NEF to which it subscribes and is linked.

The target EES may provide UE identification information to the NEF so as to specify the UE. The UE identification information may be a GPSI, an external ID, a UE IP address, or the like.

The target EES may transmit the result of operation A in step 9 to the source EES.

When the subscription to the NEF notified by the source EES is successful (case 1), the target EES deletes the locally stored UE service API context related information and performs a de-registration procedure for the UE (EEC). Further, the source EES does not perform an unsubscription request to the NEF.

When the subscription to the NEF notified by the source EES is failed (case 2), the source EES performs an unsubscription request for the UE related to the NEF.

A detailed description thereof may be summarized as operation B below.

The source EES may perform the following operation based on a subscription indication of the target EES in operation B.

Case 1: The target EES successfully subscribes to the NEF indicated by the source EES.

Delete UE service API context information stored in the source EES.

Perform an EEC de-registration procedure.

Do not perform an unsubscription operation to the NEF.

Case 2: The target EES fails to subscribe to the NEF sent by the source EES.

The source EES performs an unsubscription operation for the corresponding UE to the NEF.

Figure 16:
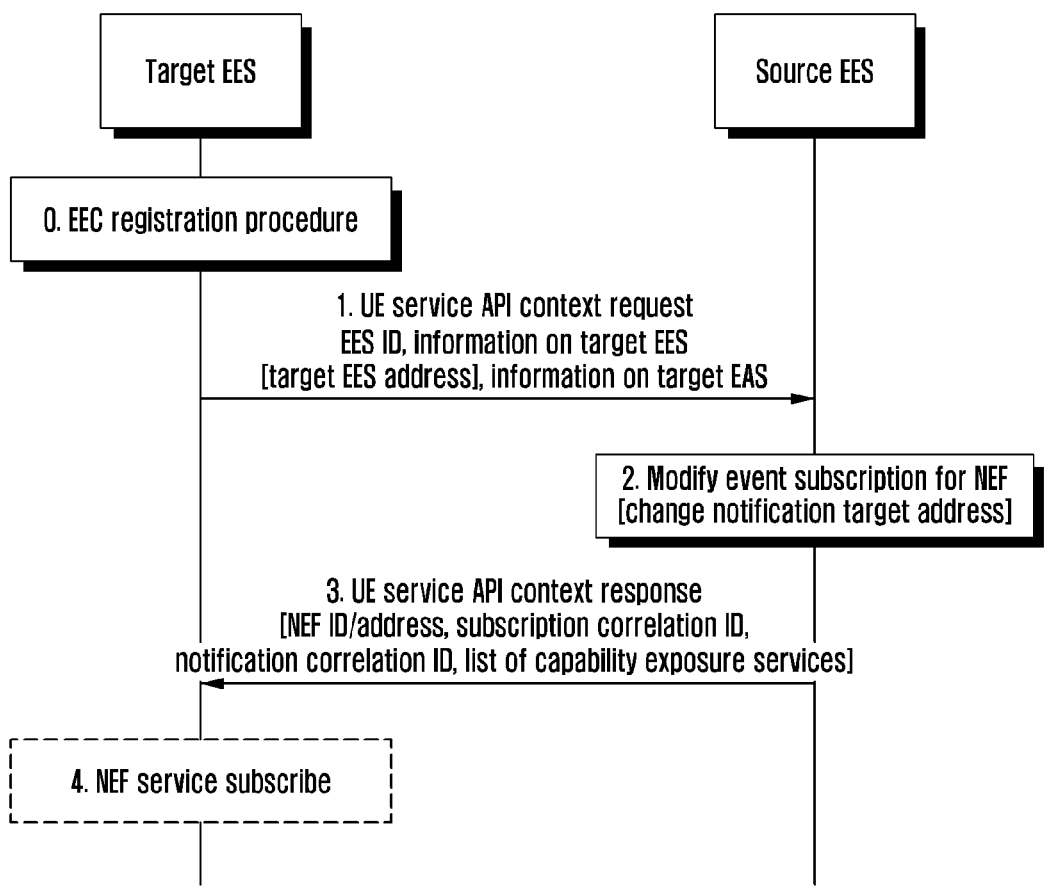
FIG. 16 is a message flow diagram illustrating a method of transferring a UE service API context according to an embodiment of the disclosure.

FIG. 16 is a message flow diagram illustrating a method of transferring a UE service API context according to an embodiment of the disclosure.

With reference to FIG. 16, in step 0, when performing an EEC registration procedure with the target EES, the EEC in the UE may provide a source EES ID and address information (e.g., FQDN, IP address, and the like) of the source EES. This enables the target EES to identify the source EES to send a UE service API context request.

The target EES may perform an operation of finding the address of the source EES based on information received from the EEC in the UE (The target EES may receive (obtain) the address of the source EES from the edge data network configuration server through a query). Thereafter, in step 1, the target EES may transmit a UE service API context request to the source EES. The UE service API context request may include the following information.

EEC ID of the UE that has performed the registration procedure to itself: The identifier may be an identifier provided from the authentication authorization function while the UE performs authentication/authorization or an ID (EEC registration context ID) given by the source EES in the EEC registration procedure.

In addition to the EEC ID, identifier information such as a GPSI that can identify the UE or an UE IP address may be transmitted.

Target EES information: A target EES FQDN, a target EES IP address, a target EES ID, edge computing service provider information (e.g., ECSP ID), and the like may be included. Target EES information may include target EES address information that may be used as a notification target address of the NEF of the 3GPP system.

EAS information that provides services to the UE connected to the target EES (application ID, EAS ID, EAS category, and the like)

Service API related information to be provided to the EAS for the UE by the target EES NEF information to which the target EES subscribes or NEF information (NEF ID/address) in which the target EES may use In step 2, the source EES may identify whether the NEF in which the target EES may use is an NEF to which it has subscribed for the corresponding UE based on information received from the target EES.

In case that the NEF is an NEF to which the source EES subscribes and has used, the source EES may identify UE related information received from the target UE and the EAS and 3GPP system that have provided a service to the corresponding UE, and find (identify) a related subscription correlation ID. The source EES may modify the subscription for a 3GPP NF (e.g., NEF or SCEF) that has exposed information related to the corresponding UE based on the identified information. The source EES may modify the notification target address to the target EES address and store a related notification correlation ID.

In case that the NEF is not an NEF to which the source EES subscribes and has used, the source EES transmits the modification failure message to the target EES through the following step 3.

In step 3, the source EES may include subscription modification related UE service API context information performed by itself in a response message (UE service API context response) and transmit the response message to the target EES. The response message may include an indication that may represent a subscription modification result. Information transferred through the response message may be an NEF ID/address, a subscription correlation ID, a notification correlation ID, a notification target address, an event ID, and the like. The subscription correlation ID is information necessary for supporting management operations such as modification and deletion of the corresponding subscription. The response message may include information for specifying a subscribed service related transaction in addition to the subscription correlation ID and be transferred (e.g., transaction reference ID, AF transaction ID, and the like). Regardless of whether the subscription modification was successful, a list of capability exposure services (the list of services provided by the source EES to the source EAS for the corresponding UE) and information (address and ID) on the NEF linked to provide an exposure service may be provided together to the target EES.

In step 4, the target EES may perform the following operations based on the subscription modification result and UE service API context information received from the source EES.

Case 1: Subscription modification is successful (in case that the NEF to which the source EES subscribes is an NEF to which the target EES may subscribe)
 Store UE service API context information received from the source EES (store a subscription ID, notification target address (target EES info), and notification correlation ID).
Case 2: Subscription modification is failed (in case that the NEF to which the source EES subscribes is an NEF to which the target EES cannot subscribe)
 The target EES performs a new subscription to an NEF to which it subscribes and is linked.
 The target EES may provide UE identification information to the NEF so as to specify the UE. In this case, the UE identification information may be a GPSI, an external ID, a UE IP address, or the like.

Figure 17:
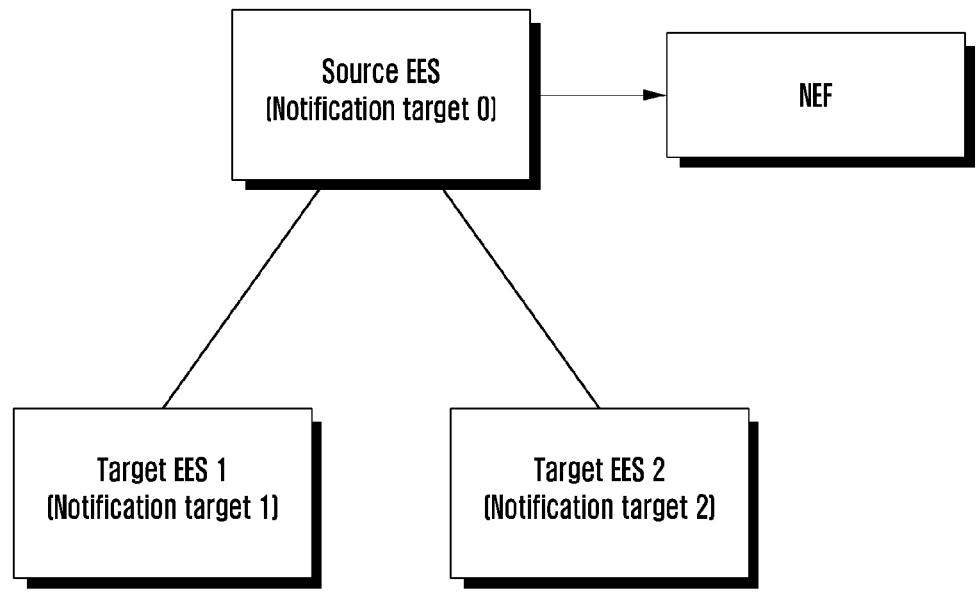
FIG. 17 is a block diagram illustrating a method in which a source EES subscribes to an NEF in order to obtain terminal information according to an embodiment of the disclosure.

FIG. 17 is a block diagram illustrating a method in which a source EES subscribes to an NEF in order to obtain UE information according to an embodiment of the disclosure.

With reference to FIG. 17, when the source EES of the disclosure subscribes to an event exposure service for the UE, the source EES may identify EESs connectable thereto as notification targets, and subscribe to the event exposure service as a representative of the EESs.

That is, the source EES may subscribe a 3GPP event exposure service to the NEF on behalf of the neighboring EES and EAS, map an ID for an event corresponding to each of the EES and the EAS and a notification target address, and store them as context information.

Thereafter, in case that the UE moves to a service area of the target EES, the source EES may identify whether the target EES exists in an EES list in which the pre-subscription is performed instead. In case that the target EES is an EES that has previously subscribed instead in the source EES, the source EES may identify a notification target address and a notification correlation ID corresponding to the target EES.

The source EES may configure a notification target address for an event to occur in the future as a target EES address based on the identified notification target address and notification correlation ID.

The embodiment described with reference to FIG. 17 may be applied to the above-described embodiments, and the source EES of the disclosure may know an event to be modified, a notification target address, a subscription correlation ID, and the like through the method described with reference to FIG. 17.

Figure 18:
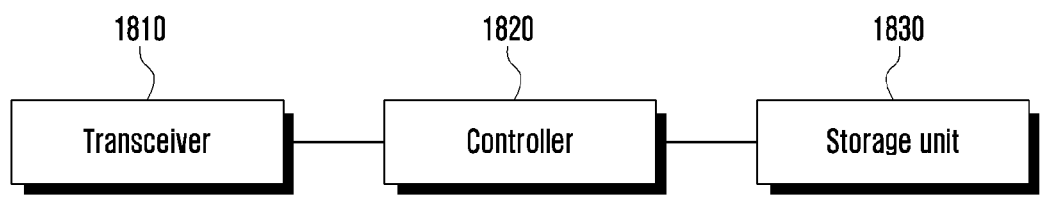
FIG. 18 is a block diagram illustrating a structure of a server according to an embodiment of the disclosure.

FIG. 18 is a block diagram illustrating a structure of a server according to an embodiment of the disclosure.

With reference to FIG. 18, the server may include a transceiver 1810, a controller 1820, and a storage unit 1830. In the disclosure, the controller may be defined as a circuit, an application specific integrated circuit, or at least one processor.

In this case, the server may correspond to at least one of an EES, EAS, or edge data network configuration server.

The transceiver 1810 may transmit and receive signals to and from other network entities. The transceiver 1810 may transmit and receive information to and from, for example, another server through a specific interface.

The controller 1820 may control overall operations of the server according to an embodiment proposed in the disclosure. For example, the controller 1820 may control a signal flow between blocks so as to perform an operation according to the above-described flowchart.

The storage unit 1830 may store at least one of information transmitted and received through the transceiver 1810 or information generated through the controller 1820.

Figure 19:
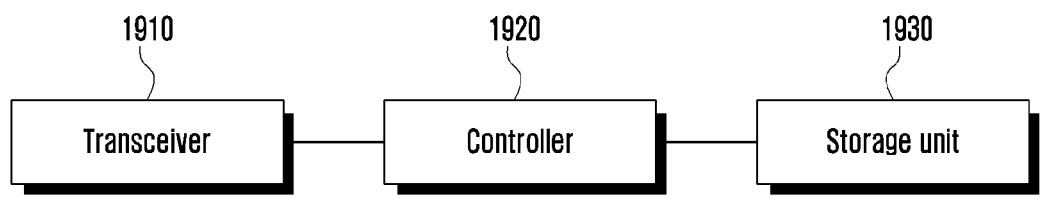
FIG. 19 is a block diagram illustrating a structure of a terminal according to an embodiment of the disclosure.

FIG. 19 is a block diagram illustrating a structure of a UE according to an embodiment of the disclosure.

With reference to FIG. 19, the UE may include a transceiver 1910, a controller 1920, and a storage unit 1930. In the disclosure, the controller may be defined as a circuit, an application specific integrated circuit, or at least one processor.

The transceiver 1910 may transmit and receive signals to and from other network entities.

The controller 1920 may control overall operations of the UE according to an embodiment proposed in the disclosure. For example, the controller 1920 may control a signal flow between blocks so as to perform an operation according to the above-described flowchart.

The storage unit 1930 may store at least one of information transmitted and received through the transceiver 1910 or information generated through the controller 1920.

The above-described embodiments were prepared focusing on an operation of interworking with the NEF, which is a network exposure function of a 3GPP 5G system. However, a network function that exposes an UE service API so as to provide UE related information in the 3GPP system is not limited to an NEF. That is, in the above operation, a device performing a network function such as a PCF or an SMF may directly perform exposure with the edge computing system. In an edge computing service provision scenario through a 3GPP 4G system, an SCEF may be an application target of the disclosure.

Further, devices in edge computing that directly receives exposed information are not limited to an EES. The EAS or edge data network configuration server may also directly obtain and use UE related information exposed through the 3GPP system. That is, a subject of an operation of the disclosure may be an EAS and an edge data network configuration server other than the EES, and this may be collectively expressed as a server. Therefore, the exchange of UE service API context information may be made not only between EES but also between various devices (e.g., the disclosure may be applied to exchange between EES<->EAS and edge data network configuration server <->EES, exchange between EESs, exchanges between EASs, or exchanges between edge data network configuration servers).

Information obtainable through the UE service API referred to in the disclosure may include all UE related information that may be provided from the 3GPP system. For example, at least one of information on an NF serving the UE and information such as a communication service quality (QoS) provided to the UE, and a policy applied to the UE as well as a location of the UE and a UE identifier used in the 3GPP system may be provided to an edge computing service through the UE service API.

In the disclosure, UE service API context information is not limited to information related to an NF to which an existing source EES subscribes. The UE service API context information may include all information necessary for finding a 3GPP system network function that can provide information necessary for edge computing services (e.g., at least one of information used for NEF discovery such as S-NSSAI, event ID supported by application function, external identifier, external group Identifier, or domain name). Further, the UE service API is not limited to a specific single UE, and includes an API for obtaining information on a group consisting of specific UEs, and UE service API context information may also include information on a group consisting of UEs in consideration of this. In this case, information on a UE group included in the UE service API context may include a group ID.

The disclosure provides a method (e.g., providing a UE service API) of obtaining information on a UE using an edge computing service through a 3GPP system. In particular, the disclosure proposes a method of obtaining information on a UE in case that the UE using an edge computing service moves (i.e., a method of supporting mobility in a method of obtaining information on a UE).

Further, the disclosure proposes a method of transmitting and receiving UE service API context information for obtaining UE related information provided from the 3GPP system between EESs.

Further, the disclosure proposes a method for an EES or an EAS to modify subscription for a 3GPP network function based on the provided UE service API context information. This relates to subscription to a northbound API of a 3GPP network function.

Further, the disclosure proposes a method for maintaining subscriptions made to other 3GPP network functions by a 3GPP network function that provides a northbound API for an edge computing service, such as an NEF, regardless of the mobility of the UE. The corresponding subscription is a subscription between 3GPP network functions and is established to provide the above UE service API.

In the drawings for describing the method of the disclosure, the order of description does not necessarily correspond to the order of execution, and the precedence relationship may be changed or may be executed in parallel.

Alternatively, some components may be omitted and only some components may be included in the drawings illustrating the method of the disclosure within a range that does not impair the essence of the disclosure.

Further, the method of the disclosure may be implemented in a combination of some or all of the contents included in each embodiment within a range that does not impair the essence of the disclosure.

Further, information included in the message in the disclosure is for describing an example of the disclosure, and some information may be omitted or additional information may be included.

In the detailed description of the disclosure, specific embodiments have been described, but various modifications are possible without departing from the scope of the disclosure. Therefore, the scope of the disclosure should not be limited to the described embodiments and should be defined not only by the claims described below, but also by equivalents of these claims.

The invention claimed is:

1. A method performed by an edge enabler server (EES) of a wireless communication system, the method comprising:
   receiving, from an edge enabler client (EEC), a first registration request message including information on whether the EEC supports application context relocation (ACR) for service continuity;
   receiving, from an edge application server (EAS), a second registration request message including information on whether the EAS supports ACR;
   obtaining information on the EES including information on whether the EES supports ACR; and
   determining an ACR mode indicating which entity is allowed to initiate the ACR among the EEC, the EAS or the EES, based on at least one of the first registration request message, the second registration request message and the information on the EES,
   wherein the EES is a source EES for determining the ACR mode.

2. The method of claim 1,
   wherein the first registration request message includes information on an ACR supported by the EEC,
   wherein the second registration request message includes information on an ACR supported by the EAS, and
   wherein the information on the EES includes information on an ACR supported by the EES.

3. The method of claim 2,
   wherein the information on whether the EEC supports ACR and the information on an ACR supported by the EEC are associated to whether an ACR procedure is initiated by the EEC,
   wherein the information on whether the EAS supports ACR and the information on an ACR supported by the EAS are associated to whether an ACR procedure is initiated by the EAS, and
   wherein the information on whether the EES supports ACR and the information on an ACR supported by the EES are associated to whether an ACR procedure is initiated by the EES.

4. The method of claim 1,
   wherein the ACR mode includes at least one of a first ACR mode for the EEC, a second ACR mode for the EAS or a third ACR mode for EES,
   wherein the first ACR mode is identified based on the first registration request message,
   wherein the second ACR mode is identified based on the second registration request message, and wherein the third ACR mode is identified based on the information on the EES.

5. The method of claim 4, further comprising:
transmitting, to the EEC, information on the ACR mode.

6. The method of claim 4,
wherein the first ACR mode corresponds to an ACR scenario supported by the EEC,
wherein the second ACR mode corresponds to an ACR scenario supported by the EAS, and
wherein the third ACR mode corresponds to an ACR scenario supported by the EES.

7. The method of claim 4,
wherein an ACR procedure performed by the EEC is based on the first ACR mode,
wherein the ACR procedure performed by the EAS is based on the second ACR mode, and
wherein the ACR procedure performed by the EES is based on the third ACR mode.

8. The method of claim 4,
wherein an ACR procedure is initiated by the EES based on the first ACR mode in a case that a terminal is out of service area.

9. An edge enabler server (EES) of a wireless communication system, the EES comprising:
a transceiver; and
a controller, wherein the controller is configured to:
receive, from an edge enabler client (EEC), a first registration request message including information on whether the EEC supports application context relocation (ACR) for service continuity,
receive, from an edge application server (EAS) a second registration request message including information on whether the EAS supports ACR,
obtain information on the EES including information on whether the EES supports ACR, and
determine an ACR mode indicating which entity is allowed to initiate the ACR among the EEC, the EAS or the EES, based on at least one of the first registration request message, the second registration request message and the information on the EES,
wherein the EES is a source EES for determining the ACR mode.

10. The EES of claim 9,
wherein the first registration request message includes information on an ACR supported by the EEC,
wherein the second registration request message includes information on an ACR supported by the EAS,
wherein the information on the EES includes information on an ACR supported by the EES,
wherein the information on whether the EEC supports ACR and the information on an ACR supported by the EEC are associated to whether an ACR procedure is initiated by the EEC,
wherein the information on whether the EAS supports ACR and the information on an ACR supported by the EAS are associated to whether an ACR procedure is initiated by the EAS, and
wherein the information on whether the EES supports ACR and the information on an ACR supported by the EES are associated to whether an ACR procedure is initiated by the EES.

11. The EES of claim 9,
wherein the ACR mode includes at least one of a first ACR mode for the EEC, a second ACR mode for the EAS or a third ACR mode for EES,
wherein the first ACR mode is identified based on the first registration request message,
wherein the second ACR mode is identified based on the second registration request message, and
wherein the third ACR mode is identified based on the information on the EES.

12. The EES of claim 11,
wherein the first ACR mode corresponds to an ACR scenario supported by the EEC,
wherein the second ACR mode corresponds to an ACR scenario supported by the EAS, and
wherein the third ACR mode corresponds to an ACR scenario supported by the EES.

13. The EES of claim 11,
wherein an ACR procedure performed by the EEC is based on the first ACR mode,
wherein the ACR procedure performed by the EAS is based on the second ACR mode, and
wherein the ACR procedure performed by the EES is based on the third ACR mode.

14. The EES of claim 11,
wherein an ACR procedure is initiated by the EES based on the first ACR mode in a case that a terminal is out of service area.

15. The EES of claim 9,
wherein the controller is further configured to:
transmit, to the EEC, information on the ACR mode.

* * * * *